(12) United States Patent
Shirasaki et al.

(10) Patent No.: US 11,378,287 B2
(45) Date of Patent: Jul. 5, 2022

(54) PIPE UNIT OR AIR CONDITIONING SYSTEM

(71) Applicant: Daikin Industries, LTD., Osaka (JP)

(72) Inventors: Tetsuya Shirasaki, Osaka (JP); Atsushi Yoshimi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 163 days.

(21) Appl. No.: 16/648,707

(22) PCT Filed: Sep. 25, 2018

(86) PCT No.: PCT/JP2018/035478
§ 371 (c)(1),
(2) Date: Mar. 19, 2020

(87) PCT Pub. No.: WO2019/065639
PCT Pub. Date: Apr. 4, 2019

(65) Prior Publication Data
US 2020/0284444 A1    Sep. 10, 2020

(30) Foreign Application Priority Data

Sep. 29, 2017    (JP) .............................. JP2017-190407

(51) Int. Cl.
*F24F 1/32* (2011.01)
*F25B 41/00* (2021.01)

(52) U.S. Cl.
CPC ................ *F24F 1/32* (2013.01); *F25B 41/00* (2013.01)

(58) Field of Classification Search
CPC .............. F24F 1/32; F25B 41/00; F16L 55/24
See application file for complete search history.

(56) References Cited

U.S. PATENT DOCUMENTS 5,927,093 A    7/1999    Noguchi et al.
7,036,328 B2 *    5/2006    Shin ....................... F25B 13/00
                                                              62/115

(Continued)

FOREIGN PATENT DOCUMENTS

CN    1595001 A    3/2005
CN    201417050 Y    3/2010

(Continued)

OTHER PUBLICATIONS

Extended European Search Report issued in corresponding European Patent Application No. 18862230.2 dated May 19, 2021 (10 pages).

(Continued)

*Primary Examiner* — Ana M Vazquez
(74) *Attorney, Agent, or Firm* — Osha Bergman Watanabe & Burton LLP

(57) ABSTRACT

A pipe unit allows refrigerant to divide or merge and includes: branch pipes; and a main pipe. The pipe unit is connected to a connection pipe, and the pipe unit and the connection pipe together form a liquid-side refrigerant channel between an outdoor unit and indoor units. The main pipe communicates with each of the branch pipes, forms a channel through which the refrigerant flows to or from each of the branch pipes, and is disposed, in an installed state, on an outdoor unit side of the branch pipes in the liquid-side refrigerant channel. The main pipe includes a first part that extends in a first direction, at least one of the branch pipes includes a second part that extends in a second direction intersecting the first direction, the first direction is horizontal in the installed state, and the second direction is vertical in the installed state.

6 Claims, 18 Drawing Sheets

(56) References Cited

U.S. PATENT DOCUMENTS

| | | |
|---|---|---|
| 2005/0050911 A1 | 3/2005 | Shin |
| 2007/0113582 A1 | 5/2007 | Sao et al. |
| 2016/0146496 A1 | 5/2016 | Yamashita |

FOREIGN PATENT DOCUMENTS

| | | |
|---|---|---|
| EP | 2667105 A1 | 11/2013 |
| JP | H08-100963 A | 4/1996 |
| JP | H09-318198 A | 12/1997 |
| JP | H10-238900 A | 9/1998 |
| JP | 2005-337524 A | 12/2005 |
| JP | 2006-266563 A | 10/2006 |
| JP | 2006-275457 A | 10/2006 |
| JP | 2016-156597 A | 9/2016 |
| JP | 2017-150706 A | 8/2017 |
| KR | 2010-0084859 A | 7/2010 |
| WO | 2015/029160 A1 | 3/2015 |

OTHER PUBLICATIONS

International Search Report issued in corresponding International Application No. PCT/JP2018/035478 dated Dec. 18, 2018 (4 pages).
International Preliminary Report on Patentability issued in corresponding International Application No. PCT/JP2018/035478 dated Mar. 31, 2020 (9 pages).

* cited by examiner

PIPE UNIT OR AIR CONDITIONING SYSTEM

TECHNICAL FIELD

The present invention relates to a pipe unit or an air conditioning system.

BACKGROUND

Related-art known air conditioning systems have an outdoor unit and a plurality of indoor units. For example, PTL 1 (International Publication No. 2015/029160) discloses an air conditioning system in which a single outdoor unit and a plurality of indoor units are connected to each other through a connection pipe. According to PTL 1, connection pipes branch off from the connection pipe in accordance with the number of the indoor units. According to PTL 1, gas-liquid two-phase transport is performed in which refrigerant transported through a liquid-side refrigerant channel extending between the outdoor unit and the indoor units is transported in a gas-liquid two-phase state.

Here, the liquid-side refrigerant channel between the outdoor unit and the indoor units are formed by the connection pipe. In this case, it is conceivable that, in some cases, traps are required to be provided in the connection pipe depending on a design specification and an installation environment.

For example, typically, the connection pipe includes branch pipes the number of which corresponds to the number of the indoor units. However, when the installation level of a subset of the indoor units is lower than that of the other subset of the indoor units or a manner of work relating to the connection pipe is restricted by the structure of the building (for example, a beam in the space above a ceiling), the installation level of a subset of branch pipes is lower than that of the other subset of the branch pipes or a subset of branch pipes is inclined downward more than the other subset of the branch pipes. In these cases, in order to prevent, for example, uneven flow or residence of the refrigerant, it is required that traps be provided in the connection pipe.

For example, when the gas-liquid two-phase transport is performed as is the case with PTL 1, it is thought that, since the filling amount of the refrigerant is smaller than usual, a branch pipe communicating with an indoor unit in the operation stop state (operation-stopped indoor unit) is not filled with the refrigerant in the liquid state, and the refrigerant to be fed to an indoor unit in the operating state (operating indoor unit) flows from a branch portion into the branch pipe communicating with the operation-stopped indoor unit. Particularly, when the installation level of the branch pipe communicating with the operation-stopped indoor unit is lower than that of a branch pipe communicating with the operating indoor unit or the branch pipe communicating with the operation-stopped indoor unit is inclined downward more than the branch pipe communicating with the operating indoor unit, the refrigerant tends to flow to the branch pipe communicating with the operation-stopped indoor unit. Thus, when the gas-liquid two-phase transport is performed, it may be required that a trap be provided in the connection pipe so as to prevent the occurrences of a situation in which the amount of the circulating refrigerant in the operating indoor unit is not correctly ensured due to flowing of the refrigerant into the operation-stopped indoor unit and residing of the refrigerant in the operation-stopped indoor unit.

Meanwhile, work relating to the connection pipe is performed by service persons at the work site, and the connection pipe is typically installed in a narrow space such as a space above a ceiling. Accordingly, it is conceivable that, in some cases, time and effort required for work for providing a trap at the work site tend to increase and work efficiency in not good. There is provided a pipe unit or an air conditioning system with which improvement of work efficiency is facilitated.

SUMMARY

A pipe unit is connected to a connection pipe, forms, together with the connection pipe, a liquid-side refrigerant channel, and allows refrigerant to divide or merge. The pipe unit includes a plurality of branch pipes and a main pipe. The connection pipe forms the liquid-side refrigerant channel between the outdoor unit and the plurality of indoor units. The main pipe communicates with each of the branch pipes. The main pipe forms a channel through which the refrigerant flows to or from the branch pipes. The main pipe is located, in an installed state, on the outdoor unit side of the branch pipes in the liquid-side refrigerant channel. The main pipe includes a first part. The first part extends in a first direction. At least one of the branch pipes includes a second part. The second part extends in a second direction. The second direction intersects the first direction. The first direction is a horizontal direction in the installed state. The second direction is a vertical direction in the installed state.

In the pipe unit, together with the connection pipe, the liquid-side refrigerant channel is formed between the outdoor unit and the plurality of indoor units, and the main pipe includes the first part extending in the first direction (horizontal direction in the installed state). The at least one of the branch pipes includes the second part that extends in the second direction (vertical direction in the installed state) intersecting the first direction. Thus, in the installed state, the second extending portion of the branch pipe extends in the vertical direction and can function as the trap. That is, the trap is easily formed by appropriately connecting the main pipe and each of the branch pipes of the pipe unit functioning as a "trap forming unit" to the connection pipe at the work site. Accordingly, when it is required to provide the trap in the connection pipe forming a liquid-side connection channel, work for bending or connecting pipes so as to form the trap at the work site is reduced. As a result, even when the connection pipe is installed in a narrow space, time and effort required for work for providing the trap are reduced. This facilitates the improvement of work efficiency.

Herein, the term "extending in the first direction" is not necessarily limited to a state in which the extending direction is coincident with the first direction (horizontal direction in the installed state). The term "extending in the first direction" also includes a state in which the extending direction is slightly inclined relative to the first direction. For example, extending while being inclined within a range of a predetermined angle (for example, 30 degrees) relative to the first direction is regarded as "extending in the first direction".

The term "extending in the second direction" is not necessarily limited to a state in which the extending direction is coincident with the second direction (vertical direction in the installed state). The term "extending in the second direction" also includes a state in which the extending direction is slightly inclined relative to the second direction. For example, extending while being inclined within a range of a predetermined angle (for example, 30 degrees) relative to the second direction is regarded as "extending in the second direction".

In the pipe unit, the at least one of the branch pipes may further include a third part and a folded back part. The third part is located, in the installed state, on the indoor unit side of the second part in the liquid-side refrigerant channel. The third part extends in the second direction. The folded back part is located, in the installed state, between the second part and the third part in the liquid-side refrigerant channel. The folded back part connects the second part and the third part to each other.

In the pipe unit, the at least one of the branch pipes may further include a fourth part. The fourth part is located, in the installed state, on the indoor unit side of the third part in the liquid-side refrigerant channel. The fourth part extends in the first direction. This allows an end portion of the main pipe on the outdoor unit side and an end portion of each of the branch pipes on the indoor unit side to be connected at the work site to the liquid-side connection pipe extending in the horizontal direction. Thus, when the connection pipe is installed in a narrow space, time and effort required for work for providing the trap are further reduced. This further facilitates the improvement of work efficiency.

In the pipe unit, the at least one of the branch pipes may further include a fifth part. The fifth part is located, in the installed state, on the outdoor unit side of the second part in the liquid-side refrigerant channel. The fifth part extends in the first direction.

In the pipe unit, the main pipe may further include a sixth part. The sixth part is located between the first part and the second part. The sixth part extends in the second direction.

In the pipe unit, the main pipe may further include a seventh part. The seventh part is located, in the installed state, on the outdoor unit side of the first part in the liquid-side refrigerant channel. The seventh part extends in the second direction. The refrigerant that flows from the outdoor unit to the indoor units flows downward through the seventh part in the installed state. The refrigerant that flows from the outdoor unit to the indoor units flows upward through the second part in the installed state.

The pipe unit may further include a connecting pipe. The branch pipes each include the second part. The connecting pipe connects end portions of the second parts on the outdoor unit side to each other. The main pipe further includes an eighth part. The eighth part is located, in the installed state, on the indoor unit side of the first part in the liquid-side refrigerant channel. The connecting pipe extends in the first direction. The connecting pipe has a plurality of end portions. The end portions of the connecting pipe are connected to any of the second parts. The eighth part extends in the second direction. An end portion of the eighth part on the indoor unit side is connected to a portion between the end portions of the connecting pipe. The refrigerant that flows from the outdoor unit to the indoor units flows downward through the eighth part in the installed state. The refrigerant that flows from the outdoor unit to the indoor units flows upward through the second part in the installed state.

In the pipe unit, the at least one of the branch pipes may be folded back so as to form a helical shape.

In the pipe unit, the first direction and the second direction may intersect at substantially right angles to each other. The term "intersect substantially at right angles" herein refers not only to a case where the first direction and the second direction intersect at 90 degrees to each other but also to a case where the first direction and the second direction intersect at an angle slightly different from 90 degrees each other. Specifically, when the first direction and the second direction intersect at an angle within a predetermined angle range (for example, greater than or equal to 60 degrees and smaller than or equal to 120 degrees) to each other, the first direction and the second direction are regarded as "intersect at substantially right angles".

In the pipe unit, a size of the branch pipes may be greater than or equal to two bus and smaller than or equal to six bus. The "two bus" and "six bus" herein are nominal diameters in a commonly used pipe size. Specifically, the "two bus" herein is one quarter of an inch. In this case, the outer diameter is 6.35 mm (or an approximate value of 6.35 mm) and the inner diameter is 4.75 mm (or an approximate value of 4.75 mm). The "six bus" herein is three quarters of an inch. In this case, the outer diameter is 19.05 mm (or an approximate value of 19.05 mm) and the inner diameter is 16.95 mm (or an approximate value of 16.95 mm).

In the pipe unit, the refrigerant that flows from the outdoor unit to the indoor units through the liquid-side refrigerant channel may flow into the liquid-side refrigerant channel in a gas-liquid two-phase state.

An air conditioning system includes the outdoor unit, the plurality of indoor units, the connection pipe, and the pipe unit.

DETAILED DESCRIPTION

An air conditioning system 100 and a second branch pipe unit 60 (pipe unit) according to one or more embodiments of the present invention will be described below. The following embodiments are a specific example and do not limit the technical scope. The embodiments can be appropriately changed without departing from the spirit thereof. In the following description, directions such as upper, lower, left, right, front, and rear are directions illustrated in FIGS. 2 and 6 to 9.

In the present invention, the "horizontal direction" includes a left-right direction and a front-rear direction. The "horizontal direction" includes not only a perfect horizontal direction but also a direction inclined relative to the horizontal line by an angle within a range of a predetermined angle (for example, 30 degrees).

In the present invention, the "vertical direction" includes an up-down direction. The "vertical direction" includes not only a perfect vertical direction but also a direction inclined relative to the vertical line by an angle within a range of a predetermined angle (for example, 45 degrees).

In the present invention, the "right angle" includes not only a perfect right angle (90 degrees) but also an angle increased or decreased within a range of "substantially right angle" (a predetermined angle relative to 90 degrees (for example, 30 degrees).

In the present invention, "operation stop state" includes not only a state in which the operation is stopped by an input of an operation stop command, a state in which the operation is stopped by interruption of power, and a state in which the operation is not performed due to a lack of an input of an operation start command but also a state in which the operation is suspended due to, for example, a thermo off.

In the present invention, a method of "coupling" or "connection" of parts is appropriately selected in accordance with an installation environment or a design specification. Although such a "method" is not limited, examples of the method include, for example, brazing, flare connection, flange connection, and so forth.

(1) Outline of the Air Conditioning System 100

Figure 1:
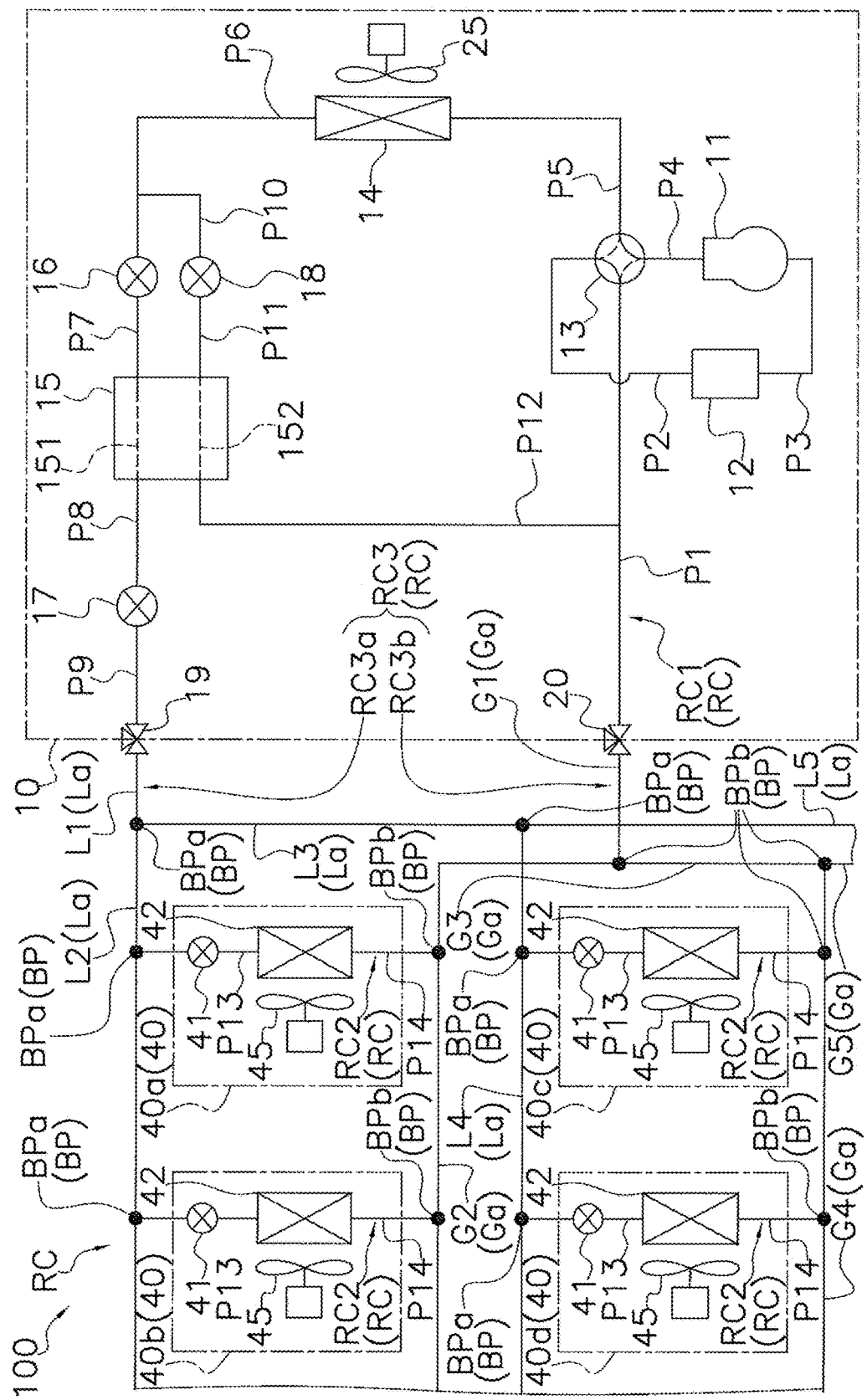
FIG. 1 is a schematic view of an air conditioning system.
Figure 2:
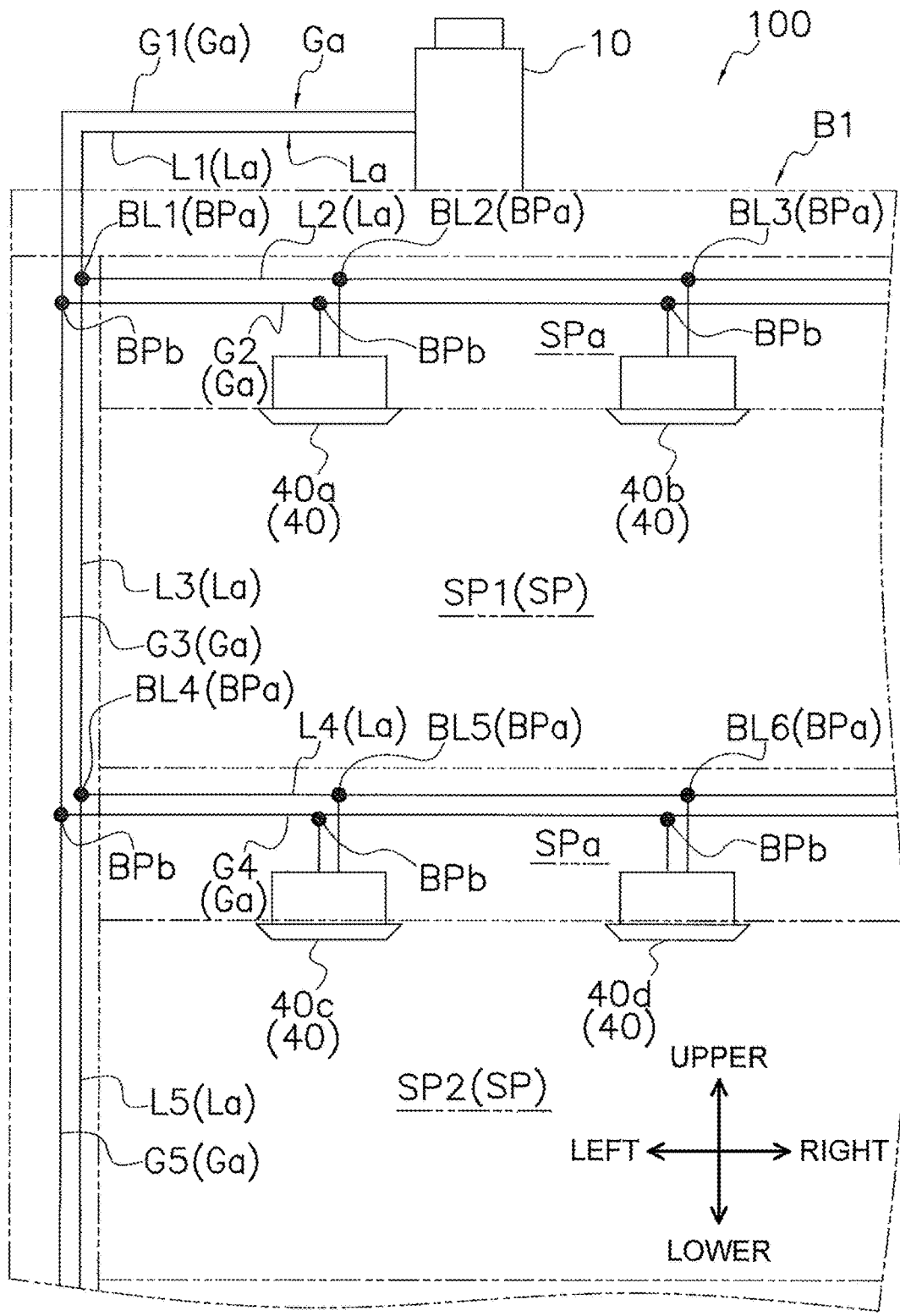
FIG. 2 schematically illustrates application of the air conditioning system.

FIG. 1 is schematic view of the air conditioning system 100. FIG. 2 schematically illustrates application of the air conditioning system 100. The air conditioning system 100 is installed in, for example, a building or a factory and realizes air conditioning in target spaces SP. According to one or more embodiments, the air conditioning system 100 conditions the air for rooms (target spaces SP1, SP2, and so forth) of a building B1 having a plurality of floors as illustrated in FIG. 2. The number of floors and the number of rooms of the building B1 can be appropriately changed. The air conditioning system 100 performs a refrigerant cycle in a refrigerant circuit RC so as to cool or heat the target spaces SP.

The air conditioning system 100 mainly has an outdoor unit 10, a plurality of (herein, four or more of) indoor units 40 (40a, 40b, 40c, 40d, . . . ), liquid-side connection piping La and gas-side connection piping Ga (corresponding to "connection pipe" described in the claims) that connects the outdoor unit 10 and the indoor units 40 to each other.

In the air conditioning system 100, the outdoor unit 10 and the indoor units 40 are connected through the liquid-side connection piping La and the gas-side connection piping Ga so as to form a refrigerant circuit RC. The air conditioning system 100 performs a vapor compression refrigeration cycle in which a refrigerant filled in the refrigerant circuit RC is compressed, cooled or condensed, decompressed, heated or evaporated, and then compressed again. Although the refrigerant filled in the refrigerant circuit RC is not limited, for example, R32 is used as the refrigerant.

The refrigerant circuit RC mainly includes an outdoor-side circuit RC1, indoor-side circuits RC2, and connection circuits RC3. The outdoor-side circuit RC1 is formed in the outdoor unit 10. An indoor-side circuit RC2 is formed in each of the indoor units 40. The connection circuits RC3 connect the outdoor-side circuit RC1 and the indoor-side circuits RC2 to each other. The connection circuits RC3 include a liquid-side connection circuit RC3a (corresponding to a "liquid-side refrigerant channel" described in the claims) and a gas-side connection circuit RC3b. The liquid-side connection circuit RC3a functions as the liquid-side refrigerant channel between the outdoor unit 10 and the indoor units 40. The gas-side connection circuit RC3b functions as a refrigerant channel on the side of gas flowing between the outdoor unit 10 and the indoor units 40.

The air conditioning system 100 performs gas-liquid two-phase transport that transports the refrigerant in a gas-liquid two-phase state through the liquid-side connection piping La extending between the outdoor unit 10 and the indoor units 40. In more detail, regarding the refrigerant transported through the liquid-side connection piping La extending between the outdoor unit 10 and the indoor units 40, in the case where the refrigerant is transported in the gas-liquid two-phase state, degradation of ability is prevented and operation can be performed with a smaller amount of the filling refrigerant compared to the case where the refrigerant is transported in the liquid state. Accordingly, the air conditioning system 100 is configured so as to perform the gas-liquid two-phase transport in the liquid-side connection circuit RC3a for saving the refrigerant. For realizing the gas-liquid two-phase transport, the air conditioning system 100 has in the outdoor unit 10 a "pressure reducing valve" (a second outdoor control valve 17, which will be described later) that decompresses the refrigerant.

A thermal load herein is a thermal load required to be processed by the indoor unit 40 in operation or the indoor units 40 in operation (operating indoor unit or operating indoor units). The thermal load is calculated in accordance with, for example, any/all of a setting temperature set in the operating indoor unit or the operating indoor units, the temperature in the target spaces SP in which the operating indoor unit or the operating indoor units are installed, the amount of circulating refrigerant, the number of rotations of an indoor fan 45, the number of rotations of a compressor 11, the capacity of an outdoor heat exchanger 14, the capacity of an indoor heat exchanger 42, and so forth.

(1-1) The Outdoor Unit 10

The outdoor unit 10 is installed at an outdoor space such as a roof top space or a balcony of a building or a space of the building outside the room (outside the target spaces SP) such as a basement. The outdoor unit 10 is connected to the plurality of indoor units 40 through the liquid-side connection piping La and the gas-side connection piping Ga and forms part of the refrigerant circuit RC (outdoor-side circuit RC1).

The outdoor unit 10 mainly has, as devices forming the outdoor-side circuit RC1, a plurality of refrigerant pipes (a first pipe P1 to a twelfth pipe P12), the compressor 11, an accumulator 12, a four-way switching valve 13, the outdoor heat exchanger 14, a super cooler 15, a first outdoor control valve 16, the second outdoor control valve 17, a third outdoor control valve 18, a liquid-side shutoff valve 19, and a gas-side shutoff valve 20.

The first pipe P1 connects the gas-side shutoff valve 20 and a first port of the four-way switching valve 13 to each other. The second pipe P2 connects an inlet port of the accumulator 12 and a second port of the four-way switching valve 13 to each other. The third pipe P3 connects an outlet port of the accumulator 12 and a suction port of the compressor 11 to each other. The fourth pipe P4 connects a discharge port of the compressor 11 and a third port of the four-way switching valve 13 to each other. The fifth pipe P5 connects a fourth port of the four-way switching valve 13 and a gas-side inlet/outlet port of the outdoor heat exchanger 14 to each other. The sixth pipe P6 connects a liquid-side inlet/outlet port of the outdoor heat exchanger 14 and one end of the first outdoor control valve 16 to each other. The seventh pipe P7 connects the other end of the first outdoor control valve 16 and one end of a main channel 151 of the super cooler 15 to each other. The eighth pipe P8 connects the other end of the main channel 151 of the super cooler 15 and one end of the second outdoor control valve 17 to each other. The ninth pipe P9 connects the other end of the second outdoor control valve 17 and one end of the liquid-side shutoff valve 19 to each other. The tenth pipe P10 connects a portion of the sixth pipe P6 between both ends and one end of the third outdoor control valve 18 to each other. The eleventh pipe P11 connects the other end of the third outdoor control valve 18 and one end of a sub-channel 152 of the super cooler 15 to each other. The twelfth pipe P12 connects the other end of the sub-channel 152 of the super cooler 15 and a portion of the first pipe P1 between both ends to each other. Each of these refrigerant pipes (P1 to P12) may be actually formed of, for example, a single pipe or a plurality of pipes connected to each other by using pipe joints.

The compressor 11 compresses the low-pressure refrigerant in the refrigeration cycle until the pressure of the refrigerant becomes a high pressure. According to one or more embodiments, the compressor 11 has a hermetic structure in which a compression element of a positive displacement type such as a rotary type or a scroll type is rotated by a compressor motor (not illustrated). Herein, the operating frequency of the compressor motor can be controlled with an inverter. Thus, capacity of the compressor 11 can be controlled.

The accumulator 12 is a container that reduces excessive suction of the liquid refrigerant into the compressor 11. The accumulator 12 has a predetermined volume in accordance with the amount of the refrigerant filled in the refrigerant circuit RC.

The four-way switching valve 13 is a channel switching valve that switches a flow of the refrigerant in the refrigerant circuit RC. The four-way switching valve 13 can be switched between a forward cycle state and a reverse cycle state. In the forward cycle state, the four-way switching valve 13 allows communication between the first port (first pipe P1) and the second port (second pipe P2) and communication between the third port (fourth pipe P4) and the fourth port (fifth pipe P5) (see solid lines of the four-way switching valve 13 illustrated in FIG. 1). In the reverse cycle state, the four-way switching valve 13 allows communication between the first port (first pipe P1) and the third port (fourth pipe P4) and communication between the second port (second pipe P2) and the fourth port (fifth pipe P5) (see broken lines of the four-way switching valve 13 illustrated in FIG. 1).

The outdoor heat exchanger 14 functions as a condenser (or a radiator) or an evaporator (or a heater) for the refrigerant. During a forward cycle operation (operation when the four-way switching valve 13 is in the forward cycle state), the outdoor heat exchanger 14 functions as the condenser for the refrigerant. During a reverse cycle operation (operation when the four-way switching valve 13 is in the reverse cycle state), the outdoor heat exchanger 14 functions as the evaporator for the refrigerant. The outdoor heat exchanger 14 includes a plurality of heat transfer tubes and a plurality of heat transfer fins (not illustrated). The outdoor heat exchanger 14 is configured so as to allow the refrigerant in the heat transfer tubes and air (outdoor air flow, which will be described later) passing around the heat transfer tubes or the heat transfer fins to exchange heat with each other.

The super cooler 15 is a heat exchanger that changes the refrigerant flowing thereinto into a liquid refrigerant in a subcooled state. The super cooler 15 is, for example, a double-pipe heat exchanger, and the main channel 151 and the sub-channel 152 are formed in the super cooler 15. The super cooler 15 is configured so as to allow the refrigerant flowing through the main channel 151 and the refrigerant flowing through the sub-channel 152 to exchange heat with each other.

The first outdoor control valve 16 is an electrically operated valve the opening degree of which can be controlled. The refrigerant flowing into the first outdoor control valve 16 is decompressed or subjected to adjustment of flow rate in accordance with the opening degree of the first outdoor control valve 16. The first outdoor control valve 16 is disposed between the outdoor heat exchanger 14 and the super cooler 15 (main channel 151). In other words, it can be said that the first outdoor control valve 16 is disposed between the outdoor heat exchanger 14 and the liquid-side connection piping La.

The second outdoor control valve 17 is an electrically operated valve the opening degree of which can be controlled. The refrigerant flowing into the second outdoor control valve 17 is decompressed or subjected to the flow rate adjustment in accordance with the opening degree of the second outdoor control valve 17. The second outdoor control valve 17 is disposed between the super cooler 15 (main channel 151) and the liquid-side shutoff valve 19. The refrigerant flowing from the outdoor unit 10 to the indoor units 40 can be shifted to the gas-liquid two-phase state by controlling the opening degree of the second outdoor control valve 17.

The third outdoor control valve 18 is an electrically operated valve the opening degree of which can be controlled. The refrigerant flowing into the third outdoor control valve 18 is decompressed or subjected to the flow rate adjustment in accordance with the opening degree of the third outdoor control valve 18. The third outdoor control valve 18 is disposed between the outdoor heat exchanger 14 and the super cooler 15 (sub-channel 152).

The liquid-side shutoff valve 19 is a manual valve disposed at a connection portion between the ninth pipe P9 and the liquid-side connection piping La. One end of the liquid-side shutoff valve 19 is connected to the ninth pipe P9, and the other end of the liquid-side shutoff valve 19 is connected to the liquid-side connection piping La.

The gas-side shutoff valve 20 is a manual valve disposed at a connection portion between the first pipe P1 and the gas-side connection piping Ga. One end of the gas-side shutoff valve 20 is connected to the first pipe P1, and the other end of the gas-side shutoff valve 20 is connected to the gas-side connection piping Ga.

The outdoor unit 10 also has an outdoor fan 25 that generates an outdoor air flow passing through the outdoor heat exchanger 14. The outdoor fan 25 is a fan that supplies to the outdoor heat exchanger 14 the outdoor air flow as a cooling source or a heating source for the refrigerant flowing through the outdoor heat exchanger 14. The outdoor fan 25 includes an outdoor fan motor (not illustrated) as a drive source. The start, the stop, and the number of rotations of the outdoor fan 25 is appropriately controlled in accordance with the circumstances.

A plurality of outdoor-side sensors (not illustrated) are disposed in the outdoor unit 10. The outdoor-side sensors detect a state (mainly, pressure or temperature) of the refrigerant in the refrigerant circuit RC. The outdoor-side sensors are pressure sensors and temperature sensors such as thermistors or thermocouples. Examples of the outdoor-side sensors include, for example, a suction pressure sensor, a discharge pressure sensor, a refrigerant temperature sensor, an outside air temperature sensor, and so forth. The suction pressure sensor detects the pressure of the refrigerant on the suction side of the compressor 11 (suction pressure). The discharge pressure sensor detects discharge pressure that is the pressure of the refrigerant on the discharge side of the compressor 11. The refrigerant temperature sensor detects the temperature of the refrigerant (for example, the degree of subcooling SC) in the outdoor heat exchanger 14. The outside air temperature sensor detects the temperature of outside air.

The outdoor unit 10 also has an outdoor-unit control unit that controls operations and states of the devices included in the outdoor unit 10. The outdoor-unit control unit includes a microcomputer that includes a central processing unit (CPU), memory, and so forth. The outdoor-unit control unit are electrically connected to the devices (such as 11, 13, 16, 17, 18, and 25) included in the outdoor unit 10 and the outdoor-side sensors. Through this connection, the outdoor-unit control unit inputs and outputs signals from and to the devices and the outdoor-side sensors, and the devices and the outdoor-side sensors input and output the signals from and to the outdoor-unit control unit. The outdoor-unit control unit transmits and receives control signals and the like to and from indoor-unit control unit (which will be described later) of the indoor units 40 and remote controllers (not illustrated) in a separate manner through communication lines.

(1-2) The Indoor Units 40

The indoor units 40 are connected to the outdoor unit 10 through the liquid-side connection piping La and the gas-side connection piping Ga. The indoor units 40 are disposed in parallel or in series with each other with respect to the outdoor unit 10. In FIG. 1, the indoor unit 40a is disposed in series with the indoor unit 40b and the like and in parallel with the indoor units 40c, 40d and the like. The indoor units 40 are disposed in the target spaces SP. In FIG. 2, the indoor units 40a and 40b are installed in the target space SP1 (more specifically, a space above a ceiling SPa of the target space SP1), and the indoor units 40c and 40d are installed in the target space SP2 (more specifically, a space above a ceiling SPa of the target space SP1) located on a lower floor than that of the target space SP1. Thus, according to one or more embodiments, the level where the indoor units 40c and 40d are installed is lower than the level where the indoor units 40a and 40b are installed.

The indoor units 40 each form part of the refrigerant circuit RC (indoor-side circuit RC2). The indoor unit 40 mainly has a plurality of refrigerant pipes (thirteenth pipe P13, fourteenth pipe P14), an indoor expansion valve 41, and the indoor heat exchanger 42 as devices forming the indoor-side circuit RC2.

The thirteenth pipe P13 connects the liquid-side connection piping La and a liquid-side refrigerant inlet/outlet port of the indoor heat exchanger 42 to each other. The fourteenth pipe P14 connects a gas-side refrigerant inlet/outlet port of the indoor heat exchanger 42 and the gas-side connection piping Ga to each other. Each of these refrigerant pipes (P13, P14) may be actually formed of, for example, a single pipe or a plurality of pipes connected to each other by using pipe joints or the like.

The indoor expansion valve 41 is an electrically operated valve the opening degree of which can be controlled. The refrigerant flowing into the indoor expansion valve 41 is decompressed or subjected to the flow rate adjustment in accordance with the opening degree of the indoor expansion valve 41. The indoor expansion valve 41 is disposed in the thirteenth pipe P13 and located between the liquid-side connection piping La and the indoor heat exchanger 42. During the forward cycle operation, the indoor expansion valve 41 decompresses the refrigerant flowing from the liquid-side connection piping La into the indoor unit 40.

The indoor heat exchanger 42 functions as an evaporator (or a heater) or a condenser (or a radiator) for the refrigerant. During the forward cycle operation, the indoor heat exchanger 42 functions as the evaporator for the refrigerant. During the reverse cycle operation, the indoor heat exchanger 42 functions as the condenser for the refrigerant. The indoor heat exchanger 42 includes a plurality of heat transfer tubes and a plurality of heat transfer fins (not illustrated). The indoor heat exchanger 42 is configured so as to allow the refrigerant in the heat transfer tubes and air (indoor air flow, which will be described later) passing around the heat transfer tubes or the heat transfer fins to exchange heat with each other.

The indoor unit 40 has the indoor fan 45 that sucks the air in the target space SP, causes the air to pass through the indoor heat exchanger 42 so as to allow the air to exchange the heat with the refrigerant, and then blows the air to the target space SP again. The indoor fan 45 includes an indoor fan motor (not illustrated) as a drive source. While being driven, the indoor fan 45 generates an indoor air flow as a heating source or a cooling source for the refrigerant flowing through the indoor heat exchanger 42.

Indoor-side sensors (not illustrated) are disposed in the indoor unit 40. The indoor-side sensors detect the state (mainly, pressure or temperature) of the refrigerant in the refrigerant circuit RC. The indoor-side sensors are a pressure sensor and a temperature sensor such as thermistors or thermocouples. Examples of the indoor-side sensors include, for example, a temperature sensor, a pressure sensor, and so forth. The temperature sensor detects the temperature (for example, the degree of superheating) of the refrigerant in the indoor heat exchanger 42. The pressure sensor detects the pressure of the refrigerant.

The indoor unit 40 also has an indoor-unit control unit that controls operations and states of the devices included in the indoor unit 40. The indoor-unit control unit has a microcomputer that includes a CPU, memory, and so forth. The indoor-unit control unit is electrically connected to the devices (41, 45) included in the indoor unit 40 and the indoor-side sensors. Through this connection, the indoor-unit control unit inputs and outputs signals from and to the devices and the indoor-side sensors, and the devices and the indoor-side sensors input and output the signals from and to the indoor-unit control unit. The indoor-unit control unit is connected to the outdoor-unit control unit and a remote controller (not illustrated) through communication lines so as to transmit and receive control signals and the like to and from the outdoor-unit control unit and the remote controller.

(1-3) Liquid-Side Connection Piping La, Gas-Side Connection Piping Ga

The liquid-side connection piping La and the gas-side connection piping Ga are connection piping that connects the outdoor unit 10 and the indoor units 40 to each other. Work relating to the liquid-side connection piping La and the gas-side connection piping Ga is performed at site. The length and diameter of the liquid-side connection piping La and the gas-side connection piping Ga are appropriately selected in accordance with the design specification and installation environment.

The liquid-side connection piping La forms one of the connection circuits RC3 on the liquid side (liquid-side connection circuit RC3a) between the outdoor unit 10 and the indoor units 40. The liquid-side connection piping La is formed by connecting a plurality of pipes, pipe joints, and so forth. Specifically, the liquid-side connection piping La includes a plurality of connection pipes (a first liquid-side connection pipe L1, a second liquid-side connection pipe L2, a third liquid-side connection pipe L3, a fourth liquid-side connection pipe L4, a fifth liquid-side connection pipe L5, . . . ), a plurality of branch portions BP (referred to as "liquid-side branch portions BPa" hereinafter), and so forth. Each of the connection pipes (L1, L2, L3, L4, L5, . . . ) included in the liquid-side connection piping La may be actually formed of, for example, a single pipe or a plurality of pipes connected to each other by using pipe joints or the like.

One end of the first liquid-side connection pipe L1 is connected to the liquid-side shutoff valve 19 of the outdoor unit 10, and the first liquid-side connection pipe L1 is disposed further toward the outdoor unit 10 side than the other connection pipes (L2, L3, L4, L5, . . . ) in the liquid-side connection circuit RC3a. The first liquid-side connection pipe L1, the second liquid-side connection pipe L2, and the third liquid-side connection pipe L3 are connected to each other so as to communicate with each other at one of the liquid-side branch portions BPa located furthest toward the outdoor unit 10 side of the liquid-side branch portions BP in the liquid-side connection circuit RC3a.

The other connection pipes (L2, L3, L4, L5, . . . ) included in the liquid-side connection piping La form refrigerant channels between the first liquid-side connection pipe L1 and the corresponding indoor units 40. According to one or more embodiments, the second liquid-side connection pipe L2 corresponds to, for example, the indoor units 40a and 40b, and the third liquid-side connection pipe L3 and the fourth liquid-side connection pipe L4 correspond to, for example, the indoor units 40c and 40d. The fifth liquid-side connection pipe L5 corresponds to, for example, other indoor units 40.

At one end side, the second liquid-side connection pipe L2 and the third liquid-side connection pipe L3 communicate with the other end side of the first liquid-side connection pipe L1 through one of the branch portions BP. With respect to the first liquid-side connection pipe L1, the second liquid-side connection pipe L2 and the third liquid-side connection pipe L3 are disposed in parallel with each other.

At one end side, the fourth liquid-side connection pipe L4 and the fifth liquid-side connection pipe L5 communicate with the other end side of the third liquid-side connection pipe L3 through one of the branch portions BP. With respect to the third liquid-side connection pipe L3, the fourth liquid-side connection pipe L4 and the fifth liquid-side connection pipe L5 are disposed in parallel with each other.

The gas-side connection piping Ga forms one of the connection circuits RC3 on the gas side (gas-side connection circuit RC3b) between the outdoor unit 10 and the indoor units 40 and, during the operation, allows the low-pressure refrigerant to flow therethrough. The gas-side connection piping Ga is formed by connecting a plurality of pipes, pipe joints, and so forth. The gas-side connection piping Ga includes a plurality of connection pipes (a first gas-side connection pipe G1, a second gas-side connection pipe G2, a third gas-side connection pipe G3, a fourth gas-side connection pipe G4, a fifth gas-side connection pipe G5), a plurality of branch portions BP (referred to as "gas-side branch portions BPb" hereinafter), and so forth. Each of the connection pipes (G1, G2, G3, G4, G5, . . . ) included in the gas-side connection piping Ga may be actually formed of, for example, a single pipe or a plurality of pipes connected to each other by using pipe joints or the like.

One end of the first gas-side connection pipe G1 is connected to the gas-side shutoff valve 20 of the outdoor unit 10, and the first gas-side connection pipe G1 is disposed further toward the outdoor unit 10 side than the other connection pipes (G2, G3, G4, G5, . . . ) in the gas-side connection circuit RC3b. The first gas-side connection pipe G1, the second gas-side connection pipe G2 and the third gas-side connection pipe G3 are connected to each other so as to communicate with each other at a gas-side branch portion BPb located furthest toward the outdoor unit 10 of the gas-side branch portions BPb in the gas-side connection circuit RC3b.

The other connection pipes (G2, G3, G4, G5, . . . ) included in the gas-side connection piping Ga form refrigerant channels between the first gas-side connection pipe G1 and the corresponding indoor units 40. According to one or more embodiments, the second gas-side connection pipe G2 corresponds to, for example, the indoor units 40a and 40b, the third gas-side connection pipe G3 and the fourth gas-side connection pipe G4 correspond to, for example, the indoor units 40c and 40d. The fifth gas-side connection pipe G5 corresponds to, for example, other indoor units 40.

At one end side, the second gas-side connection pipe G2 and the third gas-side connection pipe G3 communicate with the other end side of the first gas-side connection pipe G1 through one of the branch portions BP. With respect to the first gas-side connection pipe G1, the second gas-side connection pipe G2 and the third gas-side connection pipe G3 are disposed in parallel with each other.

At one end side, the fourth gas-side connection pipe G4 and the fifth gas-side connection pipe G5 communicate with the other end side of the third gas-side connection pipe G3 through one of the branch portions BP. With respect to the third gas-side connection pipe G3, the fourth gas-side connection pipe G4 and the fifth gas-side connection pipe G5 are disposed in parallel with each other.

According to one or more embodiments, the second liquid-side connection pipe L2 and the second gas-side connection pipe G2 are, as illustrated in FIG. 2, mainly disposed so as to extend in the horizontal direction in the space above a ceiling SPa of the target space SP1. The fourth liquid-side connection pipe L4 and the fourth gas-side connection pipe G4 are, as illustrated in FIG. 2, also mainly disposed so as to extend in the left-right direction (horizontal direction) in the space above a ceiling SPa of the target space SP2 located on a lower floor than that of the target space SP1. That is, according to one or more embodiments, the level where the fourth liquid-side connection pipe L4 and the fourth gas-side connection pipe G4 is installed is lower than the level where the second liquid-side connection pipe L2 and the second gas-side connection pipe G2 are installed. Furthermore, the third liquid-side connection pipe L3 and the third gas-side connection pipe G3 are, as illustrated in FIG. 2, mainly disposed so as to extend in the up-down direction (vertical direction) mainly in a space between an outer wall of the building B1 and an inner walls of the target spaces SR.

In the following description, one or both of the liquid-side connection piping La and the gas-side connection piping Ga are referred to as "connection piping". In the connection circuits RC3, out of the connection pipes connected at the branch portions BP, connection pipes located on the outdoor unit 10 side (for example, L1 with respect to L2, L3 and L3 with respect to L4, L5) are referred to as "outdoor unit-side connection pipes CP1", and any/all of connection pipes communicating with the outdoor unit-side connection pipes CP1 (for example, L2, L3 with respect to L1 and L4, L5 with respect to L3) are referred to as an "indoor unit-side connection pipe CP2" or "indoor unit-side connection pipes CP2".

The branch portions BP (liquid-side branch portions BPa, gas-side branch portions BPb) included in the connection piping are portions where the refrigerant flowing from the outdoor unit 10 side (that is, the outdoor unit-side connection pipe CP1 side) is diverted to the indoor unit-side connection pipes CP2 and also portions where the refrigerant flowing from the indoor unit-side connection pipe CP2 side merge with each other.

The branch portions BP of the air conditioning system 100 are each formed by a branch pipe unit 50 (a first branch pipe unit 51 or the second branch pipe unit 60). The details of the branch pipe unit 50 will be described later.

(2) The Flow of the Refrigerant in the Refrigerant Circuit RC

The flow of the refrigerant in the refrigerant circuit RC is described below. The air conditioning system 100 mainly performs a forward cycle operation such as a cooling operation and a reverse cycle operation such as a heating operation. Herein, low pressure in the refrigerant cycle is the pressure of the refrigerant sucked into the compressor 11 and high pressure in the refrigerant cycle is the pressure of the refrigerant discharged from the compressor 11.

(2-1) The Flow of the Refrigerant During the Forward Cycle Operation

Figure 3:
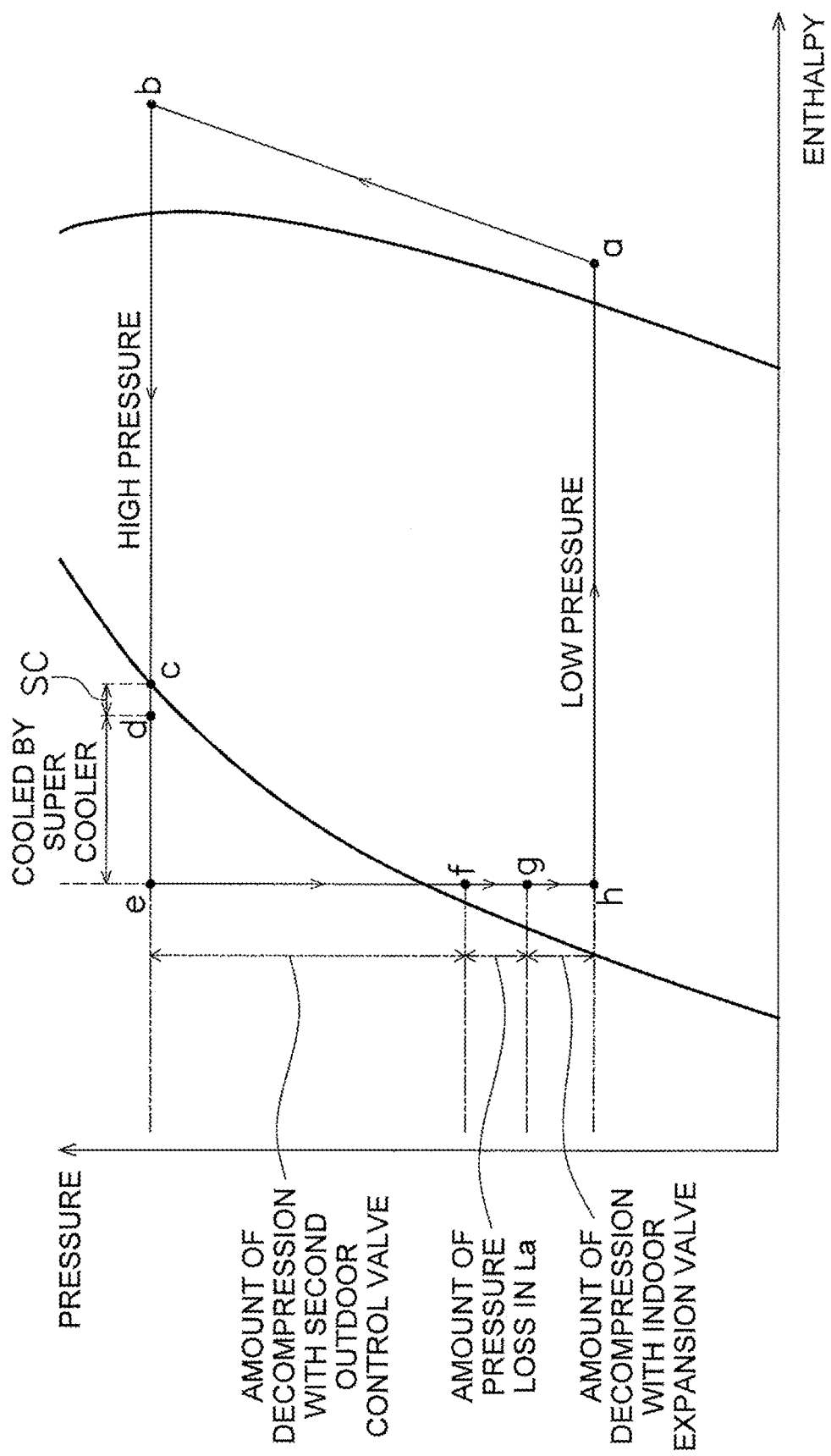
FIG. 3 is a diagrammatic view of an example of a refrigerant cycle during a forward cycle operation (during normal control).

FIG. 3 is a diagrammatic view of an example of the refrigerant cycle during the forward cycle operation (during normal control). During the forward cycle operation, the four-way switching valve 13 is controlled to assume the forward cycle state, and the refrigerant filled in the refrigerant circuit RC mainly circulates through the outdoor-side circuit RC1 (the compressor 11, the outdoor heat exchanger 14, the first outdoor control valve 16, the main channel 151 of the super cooler 15, and the second outdoor control valve 17), the liquid-side connection circuit RC3a, and the indoor-side circuit RC2 (the indoor expansion valve 41 and the indoor heat exchanger 42) of the operating indoor unit 40 or the operating indoor units 40 (the operating indoor unit or the operating indoor units), and the compressor 11 in this order. In the forward cycle operation, part of the refrigerant flowing through the sixth pipe P6 is diverted to the ninth pipe P9, passes through the third outdoor control valve 18 and the super cooler 15 (sub-channel 152), and then is returned to the outdoor-side circuit RC1 (compressor 11) through the gas-side connection circuit RC3b.

Specifically, when the forward cycle operation starts, in the outdoor-side circuit RC1, the refrigerant is sucked into the compressor 11, compressed until the pressure reaches the high pressure of the refrigerant cycle, and then discharged (see a-b illustrated in FIG. 3). Capacity of the compressor 11 is controlled in accordance with a thermal load required by the operating indoor unit or the operating indoor units. Specifically, a target value of a suction pressure (see a illustrated in FIG. 3) is set in accordance with the thermal load required by the indoor unit 40 or the indoor units 40, and the operating frequency of the compressor 11 is controlled such that the suction pressure becomes the target value. The gas refrigerant discharged from the compressor 11 flows into the gas-side inlet/outlet port of the outdoor heat exchanger 14.

The gas refrigerant having flowed into the outdoor heat exchanger 14 exchanges heat with the outdoor air flow supplied by the outdoor fan 25 so as to radiate heat and condense (see b-d illustrated in FIG. 3) in the outdoor heat exchanger 14. In so doing, the refrigerant becomes the liquid refrigerant in the subcooled state with the degree of subcooling SC (see c-d illustrated in FIG. 3). The refrigerant having flowed out through the liquid-side inlet/outlet port of the outdoor heat exchanger 14 is diverted while flowing through the sixth pipe P6.

One part of the refrigerant having been diverted while flowing through the sixth pipe P6 flows into the main channel 151 of the super cooler 15 through the first outdoor control valve 16. The refrigerant having flowed into the main channel 151 of the super cooler 15 exchanges heat with the refrigerant flowing through the sub-channel 152 and is cooled so as to enter a state with an additional degree of subcooling (see d-e illustrated in FIG. 3).

The refrigerant having flowed out from the main channel 151 of the super cooler 15 is decompressed or subjected to the flow rate adjustment in accordance with the degree of opening of the second outdoor control valve 17 so as to enter the gas-liquid two-phase state and becomes an intermediate-pressure refrigerant the pressure of which is lower than that of the high-pressure refrigerant and higher than that of the low-pressure refrigerant (see e-f illustrated in FIG. 3). Thus, during the forward cycle operation, the refrigerant in the gas-liquid two-phase state is fed to the liquid-side connection circuit RC3a (liquid-side connection piping La), and accordingly, the gas-liquid two-phase transport of the refrigerant fed from the outdoor unit 10 side to the indoor unit 40 side is realized. That is, the second outdoor control valve 17 decompresses the refrigerant so as to cause the refrigerant flowing from the outdoor unit 10 to the indoor unit 40 or the indoor units 40 to pass through the liquid-side connection piping La in the gas-liquid two-phase state during the forward cycle operation. In relation to this, compared to the case where the refrigerant flowing through the liquid-side connection piping La is transported in the liquid state, filling of the liquid-side connection piping La with the refrigerant in the liquid state is eliminated. This can reduce the amount of the refrigerant existing in the liquid-side connection piping La correspondingly.

The gas-liquid two-phase refrigerant having flowed from the outdoor unit 10 flows into the indoor-side circuit RC2 of the operating indoor unit or each of the operating indoor units through the liquid-side connection circuit RC3a. The pressure of the refrigerant flowing through the liquid-side connection circuit RC3a is reduced due to loss of pressure (see f-g illustrated in FIG. 3).

In the outdoor-side circuit RC1, the other part of the refrigerant having been diverted while flowing through the sixth pipe P6 flows into the third outdoor control valve 18 and is decompressed or subjected to the flow rate adjustment in accordance with the degree of opening of the third outdoor control valve 18, and then flows into the sub-channel 152 of the super cooler 15. The refrigerant having flowed into the sub-channel 152 of the super cooler 15 exchanges heat with the refrigerant flowing through the main channel 151, and then passes through the twelfth pipe P12 and merges with the refrigerant flowing through the first pipe P1.

The refrigerant having flowed into the indoor-side circuit RC2 flows into the indoor expansion valve 41, is decompressed in accordance with the degree of opening of the indoor expansion valve 41 until the pressure thereof becomes the low pressure in the refrigerant cycle (see g-h illustrated in FIG. 3), and then flows into the indoor heat exchanger 42.

The refrigerant having flowed into the indoor heat exchanger 42 exchanges heat with the indoor air flow supplied by the outdoor fan 45 so as to evaporate and becomes the gas refrigerant (see h-a illustrated in FIG. 3). The refrigerant having flowed from the indoor heat exchanger 42 flows out from the indoor-side circuit RC2.

The refrigerant having flowed from the indoor-side circuit RC2 flows through the gas-side connection circuit RC3b and flows into the outdoor-side circuit RC1. The refrigerant having flowed into the outdoor-side circuit RC1 flows through the first pipe P1, passes through the four-way switching valve 13 and the second pipe P2, and flows into the accumulator 12. The refrigerant having flowed into the accumulator 12 is temporarily accumulated, and then sucked into the compressor 11 again.

(2-2) The Flow of the Refrigerant During the Reverse Cycle Operation

During the reverse cycle operation, the four-way switching valve 13 is controlled to assume the reverse cycle state, and the refrigerant filling the refrigerant circuit RC mainly circulates through the outdoor-side circuit RC1 (compressor 11), gas-side connection circuit RC3b, the indoor-side circuit RC2 of the operating indoor unit or the operating indoor units (the indoor heat exchanger 42 and the indoor expansion valve 41), the liquid-side connection circuit RC3a, to the outdoor-side circuit RC1 (the second outdoor control valve 17, the super cooler 15, the first outdoor control valve 16, the outdoor heat exchanger 14, and the compressor 11) in this order.

Specifically, when the reverse cycle operation starts, in the outdoor-side circuit RC1, the refrigerant is sucked into the compressor 11, compressed until the pressure reaches the high pressure, and then discharged. Capacity of the compressor 11 is controlled in accordance with a thermal load required by the operating indoor unit or the operating indoor units. The gas refrigerant having discharged from the compressor 11 passes through the fourth pipe P4 and the first pipe P1, flows from the outdoor unit 10, passes through the gas-side connection circuit RC3b, and flows into the indoor-side circuit RC2 of the operating indoor unit or the operating indoor units.

The refrigerant having flowed into the indoor-side circuit RC2 flows into the indoor heat exchanger 42 and exchanges heat with the indoor air flow supplied by the indoor fan 45 so as to condense. The refrigerant having flowed from the indoor heat exchanger 42 flows into the indoor expansion valve 41, is decompressed in accordance with the degree of opening of the indoor expansion valve 41 until the pressure thereof becomes the low pressure in the refrigerant cycle. Then, the refrigerant flows from the indoor-side circuit RC2.

The refrigerant having flowed from the indoor-side circuit RC2 flows through the liquid-side connection circuit RC3a and flows into the outdoor-side circuit RC1. The refrigerant having flowed into the outdoor-side circuit RC1 passes through the ninth pipe P9, the second outdoor control valve 17, the eighth pipe P8, the super cooler 15 (main channel 151), the seventh pipe P7, the first outdoor control valve 16, and the sixth pipe P6 and flows into the liquid-side inlet/outlet port of the outdoor heat exchanger 14.

The refrigerant having flowed into the outdoor heat exchanger 14 exchanges heat with the outdoor air flow supplied by the outdoor fan 25 so as to evaporate in the outdoor heat exchanger 14. Then, the refrigerant flows out through the gas-side inlet/outlet port of the outdoor heat exchanger 14, passes through the fifth pipe P5, the four-way switching valve 13, and the second pipe P2, and flows into the accumulator 12. The refrigerant having flowed into the accumulator 12 is temporarily accumulated, and then sucked into the compressor 11 again.

(3) Details of the Branch Pipe Unit 50

The branch pipe unit 50 forms the branch portions BP in the connection circuits RC3. The branch pipe unit 50 is assembled in advance in the factory or on site before the work and connected to the other pipes (herein, the outdoor unit-side connection pipes CP1 and the indoor unit-side connection pipes CP2) in a work site.

The branch pipe unit 50 disposed in the refrigerant circuit RC is either the first branch pipe unit 51 or the second branch pipe unit 60, which has a function of forming a trap in the connection circuits RC3. For each of the branch portions BP, an optimum one of the first branch pipe unit 51 or the second branch pipe unit 60 is selected.

(3-1) The First Branch Pipe Unit 51

Figure 4:
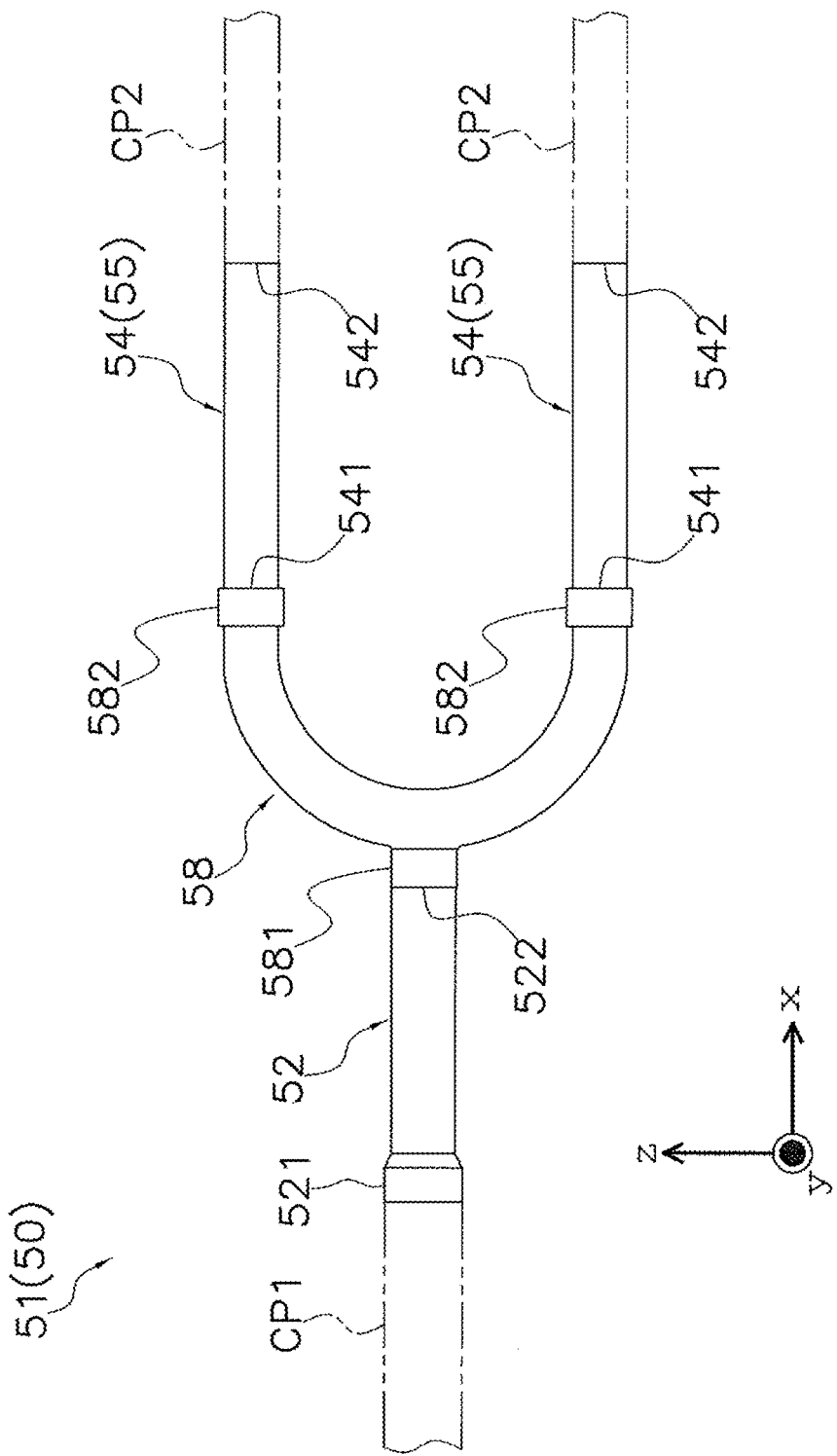
FIG. 4 is a schematic view of a first branch pipe unit.

FIG. 4 is a schematic view of the first branch pipe unit 51. According to one or more embodiments, the x direction and the y direction are perpendicular to each other. The first branch pipe unit 51 includes a main pipe 52, a branch pipe group 55 including a plurality of (two herein) branch pipes 54, and a connection pipe portion 58. In the first branch pipe unit 51, the main pipe 52 and the branch pipes 54 are connected to each other through the connection pipe portion 58 so as to communicate with each other.

Figure 6:
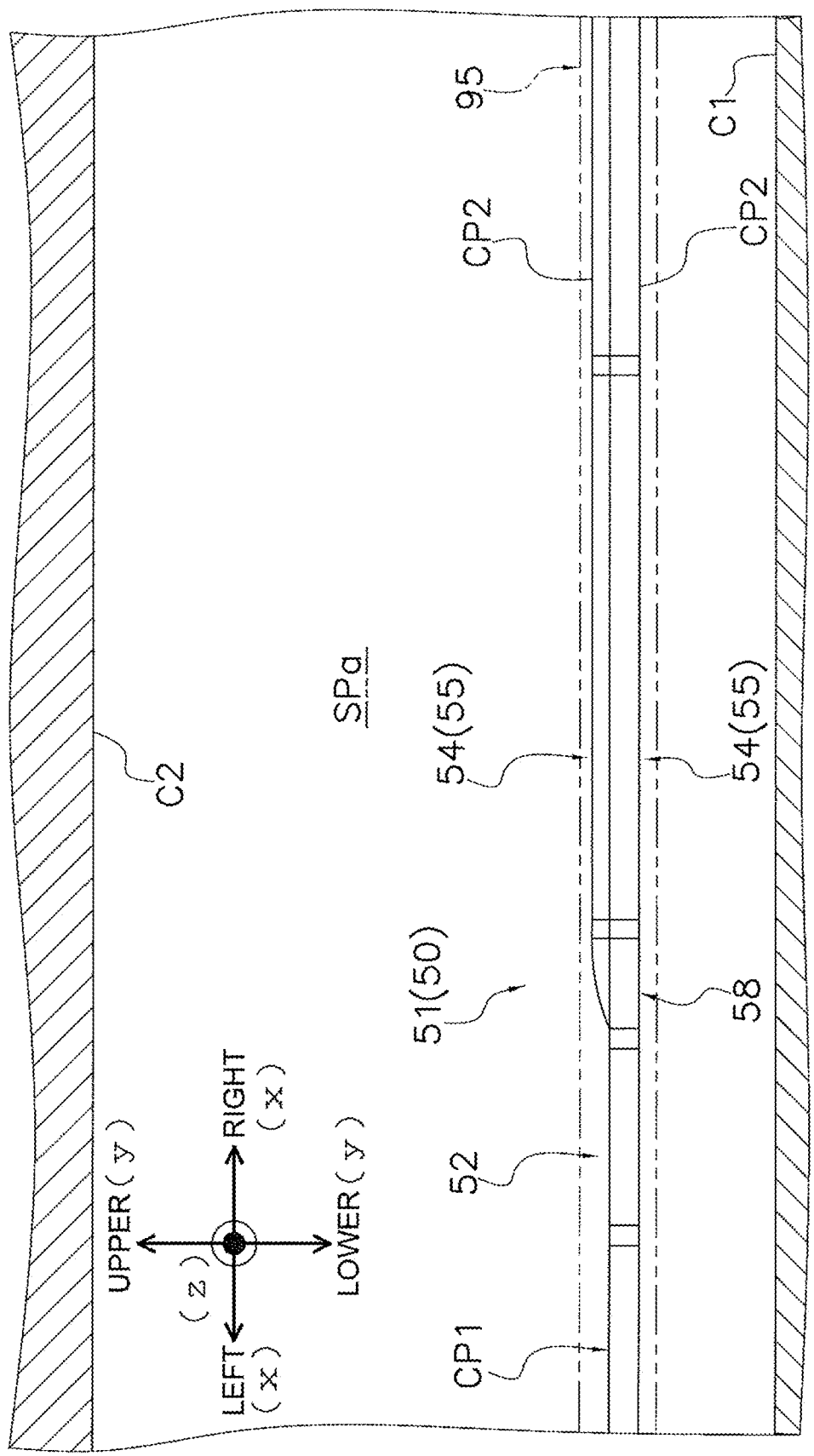
FIG. 6 is a diagrammatic view of an example of an installation form of the first branch pipe unit.

The main pipe 52 extends mainly in the x direction (see, for example, FIGS. 4 and 6). In an installed state, the main pipe 52 is located further toward the outdoor unit 10 side than the connection pipe portion 58. The main pipe 52 corresponds to any one of the outdoor unit-side connection pipes CP1 on a one-to-one basis. In the installed state, one end 521 of the main pipe 52 is connected to the corresponding outdoor unit-side connection pipe CP1. The other end 522 of the main pipe 52 is connected to a first connection portion 581 of the connection pipe portion 58. The main pipe 52 forms a channel through which the refrigerant flows to or from the branch pipes 54 connected thereto.

The branch pipes 54 mainly extend in the x direction (see, for example, FIGS. 4 and 6). In an installed state, the branch pipes 54 are located further toward the corresponding indoor unit 40 side than the connection pipe portion 58. In the installed state, one end 541 of each of the branch pipes 54 is independently connected to a corresponding one of second connection portions 582 of the connection pipe portion 58. The branch pipes 54 correspond to any of the indoor unit-side connection pipes CP2 on a one-to-one basis, and other ends 542 of the branch pipes 54 are connected to the corresponding indoor unit-side connection pipes CP2.

The connection pipe portion 58 connects the main pipe 52 and the branch pipe group 55 (each of the branch pipes 54)

in the first branch pipe unit 51 to each other. According to one or more embodiments, as illustrated in FIG. 4, the connection pipe portion 58 is curved to have a substantially U shape or a substantially C shape when seen from the y direction. The connection pipe portion 58 has the first connection portion 581 connected to the main pipe 52. The connection pipe portion 58 has a plurality of (equal to the number of the branch pipes 54 included in the first branch pipe unit 51, two herein) second connection portions 582 connected to the corresponding branch pipes 54. The connection pipe portion 58 has the first connection portion 581 at one end side and branches into two parts at the other end side. The connection pipe portion 58 has the second connection portions 582 at end portions of respective divided portions.

(3-2) The Second Branch Pipe Unit 60

Figure 5:
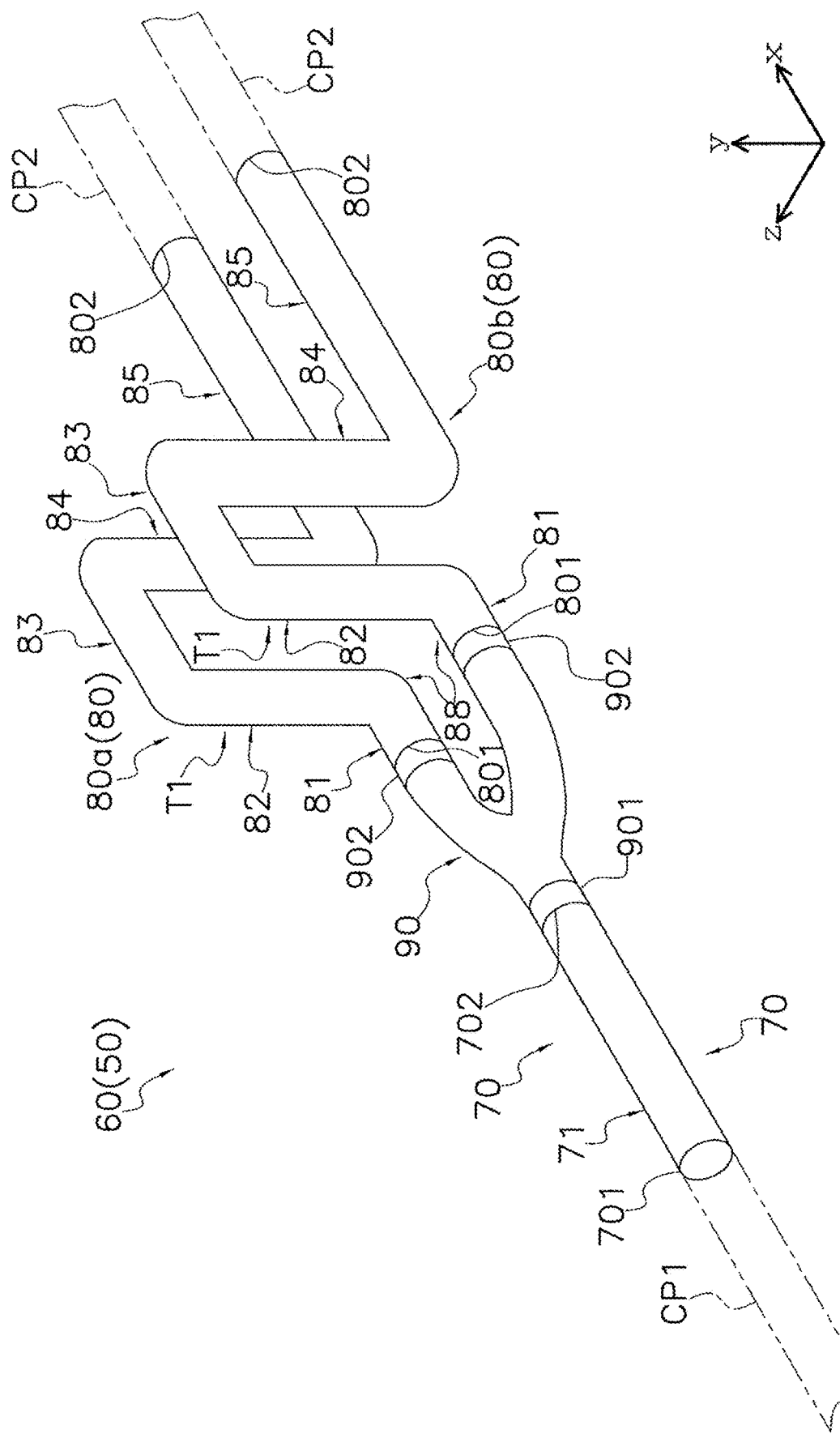
FIG. 5 is a schematic view of a second branch pipe unit.

FIG. 5 is a schematic view of the second branch pipe unit 60. According to one or more embodiments, the x direction and the y direction are perpendicular to each other.

The second branch pipe unit 60 includes a main pipe 70, a branch pipe group 88 including a plurality of (two herein) branch pipes 80, and a connection pipe portion 90. In the second branch pipe unit 60, the main pipe 70 and the branch pipes 80 are connected to each other through the connection pipe portion 90 so as to communicate with each other.

The main pipe 70 (corresponding to a "main pipe" described in the claims) allows the refrigerant flowing from the corresponding outdoor unit-side connection pipe CP1 to be fed to the connection pipe portion 90 or the refrigerant flowing from the connection pipe portion 90 to be fed to the outdoor unit-side connection pipe CP1. In an installed state, the main pipe 70 is located further toward the outdoor unit 10 side than the connection pipe portion 90. The main pipe 70 corresponds to any one of the outdoor unit-side connection pipes CP1 on a one-to-one basis. The main pipe 70 has a first main pipe portion 71 that extends mainly in the x direction (see, for example, FIGS. 5 and 7). According to one or more embodiments, a proximal end of the first main pipe portion 71 forms one end 701 of the main pipe 70 and a distal end of the first main pipe portion 71 forms another end 702 of the main pipe 70. In the installed state, the main pipe 70 is connected to one of the outdoor unit-side connection pipes CP1 to which the proximal end (701) corresponds. The main pipe 70 is connected to a first connection portion 901 of the connection pipe portion 90 at the distal end (702). The main pipe 70 forms a channel through which the refrigerant flows to or from the branch pipes 80 connected thereto. According to one or more embodiments, a configuration form of the main pipe 70 is substantially the same as that of the main pipe 52 of the first branch pipe unit 51.

According to one or more embodiments, the branch pipe group 88 includes two branch pipes 80 (80a and 80b). In an installed state, the branch pipes 80 (corresponding to "branch pipes" described in the claims) are located further toward the corresponding indoor unit 40 side than the connection pipe portion 90. In the installed state, one end 801 of each of the branch pipes 80 is independently connected to a corresponding one of second connection portions 902 of the connection pipe portion 90. The branch pipes 80 correspond to any of the indoor unit-side connection pipes CP2 on a one-to-one basis, and the other end 802 of each of the branch pipes 80 is connected to a corresponding one of the indoor unit-side connection pipes CP2.

The size of the branch pipes 80 is appropriately selected in accordance with the design specification and the installation environment. According to one or more embodiments, the size of the branch pipes 80 is a size appropriate for forming the liquid-side connection circuit RC3a (specifically, set to a size greater than or equal to two bus and smaller than or equal to six bus). The "two bus" and "six bus" herein are nominal diameters in a commonly used pipe size. Specifically, the "two bus" herein is one quarter of an inch. In this case, the outer diameter is 6.35 mm (or an approximate value of 6.35 mm) and the inner diameter is 4.75 mm (or an approximate value of 4.75 mm). The "six bus" herein is three quarters of an inch. In this case, the outer diameter is 19.05 mm (or an approximate value of 19.05 mm) and the inner diameter is 16.95 mm (or an approximate value of 16.95 mm).

Each of the branch pipes 80 includes portions extending in the x direction (corresponding to a "first direction" described in the claims) and portions extending in the y direction (corresponding to a "second direction" described in the claims) intersecting the x direction. Specifically, the branch pipe 80 includes a first extending portion 81, a second extending portion 82, a folded back portion 83, a third extending portion 84, and a fourth extending portion 85. According to one or more embodiments, the portions (81 to 85) of the branch pipe 80 including the first extending portion 81, the second extending portion 82, the folded back portion 83, the third extending portion 84, and the fourth extending portion 85 continuously extend in this order and integrated with each other.

The first extending portion 81 (corresponding to a "fifth part" described in the claims) extends mainly in the x direction (that is, an extending direction of the main pipe 70). The first extending portion 81 is located further toward the main pipe 70 side than the other portions of the branch pipe 80 (the second extending portion 82 to the fourth extending portion 85). That is, in the installed state, the first extending portion 81 is located further toward the outdoor unit 10 side than the other portions of the branch pipe 80 (the second extending portion 82, the folded back portion 83, the third extending portion 84, and the fourth extending portion 85) in the connection circuits RC3. According to one or more embodiments, one end of the first extending portion 81 corresponds to the one end 801 of the branch pipe 80 and is connected to the second connection portion 902 of the connection pipe portion 90 in the installed state. The other end of the first extending portion 81 is connected to the second extending portion 82. In the installed state, the first extending portion 81 allows the refrigerant flowing thereinto to be fed from one of the connection pipe portion 90 and the second extending portion 82 to the other of the connection pipe portion 90 and the second extending portion 82.

The second extending portion 82 (corresponding to a "second part" described in the claims) extends mainly in the y direction (that is, a direction intersecting the extending direction of the main pipe 70). According to one or more embodiments, the second extending portion 82 extends at right angles to the extending direction of the first extending portion 81 and the main pipe 70. The second extending portion 82 extends between the first extending portion 81 and the folded back portion 83. The second extending portion 82 is located further toward the main pipe 70 side than the folded back portion 83, the third extending portion 84, and the fourth extending portion 85. That is, in the installed state, the second extending portion 82 is located further toward the indoor unit 40 side than the first extending portion 81 and located further toward the outdoor unit 10 side than the folded back portion 83, the third extending portion 84, and the fourth extending portion 85 in the connection circuits RC3. One end of the second extending portion 82 is connected to the first extending portion 81. The other end of the second extending portion 82 is connected to the folded back portion 83. In the installed state, the second extending portion 82 allows the refrigerant flowing thereinto to be fed from one of the first extending portion 81 and the folded back portion 83 to the other of the first extending portion 81 and the folded back portion 83.

The folded back portion 83 (corresponding to a "folded back part" described in the claims) extends mainly in the y direction (extending direction of the second extending portion 82), is curved so as to extend in the x direction, and then curved further so as to extend in the y direction (extending direction of the third extending portion 84). The folded back portion 83 extends between the second extending portion 82 and the folded back portion 83 so as to connect the second extending portion 82 and the folded back portion 83 to each other. The folded back portion 83 is located further toward the main pipe 70 side than the third extending portion 84 and the fourth extending portion 85. That is, in the installed state, the folded back portion 83 is located between the second extending portion 82 and the third extending portion 84, further toward the indoor unit 40 side than the first extending portion 81 and the second extending portion 82, and further toward the outdoor unit 10 side than the third extending portion 84 and the fourth extending portion 85 in the connection circuits RC3. One end of the folded back portion 83 is connected to the other end of the second extending portion 82. The other end of the folded back portion 83 is connected to the third extending portion 84. In the installed state, the folded back portion 83 forms a refrigerant channel that allows the refrigerant flowing thereinto to fold back from one of the second extending portion 82 and the third extending portion 84 to the other of the second extending portion 82 and the third extending portion 84. Although the folded back portion 83 is illustrated such that the folded back portion 83 has a linearly extending portion in the x direction, the folded back portion 83 may be formed of, for example, a pipe bent into a U shape. When the folded back portion 83 is formed of the U-shaped pipe as described above, influence of the pressure loss of the refrigerant can be further reduced.

The third extending portion 84 (corresponding to a "indoor unit-side vertical branch pipe part" described in the claims) extends mainly in the y direction (that is, a direction intersecting the extending direction of the main pipe 70). The extending direction of the third extending portion 84 is opposite to the extending direction of the second extending portion 82. The third extending portion 84 extends between the folded back portion 83 and the fourth extending portion 85 so as to connect the folded back portion 83 and the fourth extending portion 85 to each other. The third extending portion 84 is located further toward the main pipe 70 side than the fourth extending portion 85. That is, in the installed state, the third extending portion 84 is located further toward the indoor unit 40 side than the first extending portion 81, the second extending portion 82, and the folded back portion 83 and located further toward the outdoor unit 10 side than the fourth extending portion 85 in the connection circuits RC3. One end of the third extending portion 84 is connected to the other end of the folded back portion 83. The other end of the third extending portion 84 is connected to the fourth extending portion 85. In the installed state, the third extending portion 84 allows the refrigerant flowing thereinto to be fed from one of the folded back portion 83 and the fourth extending portion 85 to the other of the folded back portion 83 and the fourth extending portion 85.

The fourth extending portion 85 (corresponding to a "horizontal branch pipe part" described in the claims) extends mainly in the x direction (that is, the extending direction of the main pipe 70). The fourth extending portion 85 extends at right angles to the extending direction of the third extending portion 84. The extending direction of the fourth extending portion 85 is coincident with the extending direction of the first extending portion 81. In the installed state, the fourth extending portion 85 extends between the third extending portion 84 and the indoor unit-side connection pipe CP2 so as to connect the third extending portion 84 and the indoor unit-side connection pipe CP2 to each other. In the installed state, the fourth extending portion 85 is located further toward the indoor unit 40 side than the first extending portion 81, the second extending portion 82, the folded back portion 83, and the third extending portion 84 in the connection circuits RC3. One end of the fourth extending portion 85 is connected to the other end of the third extending portion 84. The other end of the fourth extending portion 85 corresponds to the other end 802 of the branch pipe 80 and, in the installed state, is connected to the corresponding indoor unit-side connection pipe CP2. In the installed state, the fourth extending portion 85 allows the refrigerant flowing thereinto to be fed from one of the third extending portion 84 and the indoor unit-side connection pipe CP2 to the other of the third extending portion 84 and the indoor unit-side connection pipe CP2.

The connection pipe portion 90 connects the main pipe 70 and the branch pipe group 88 (each of the branch pipes 80) to each other in the second branch pipe unit 60. According to one or more embodiments, as illustrated in FIG. 5, the connection pipe portion 90 is curved to have a substantially U shape or a substantially C shape when seen from the y direction. The connection pipe portion 90 has the first connection portion 901 connected to the main pipe 70. The connection pipe portion 90 has the plurality of (equal to the number of the branch pipes 80 included in the second branch pipe unit 60, two herein) second connection portions 902 connected to the corresponding branch pipes 80. The connection pipe portion 90 has the first connection portion 901 at one end side and branches into two parts at the other end side. The connection pipe portion 90 has the second connection portions 902 at end portions of respective divided portions. According to one or more embodiments, a configuration form of the connection pipe portion 90 is substantially the same as that of the connection pipe portion 90 of the first branch pipe unit 51.

(3-3) Installation Form of the Branch Pipe Unit 50

Figure 7:
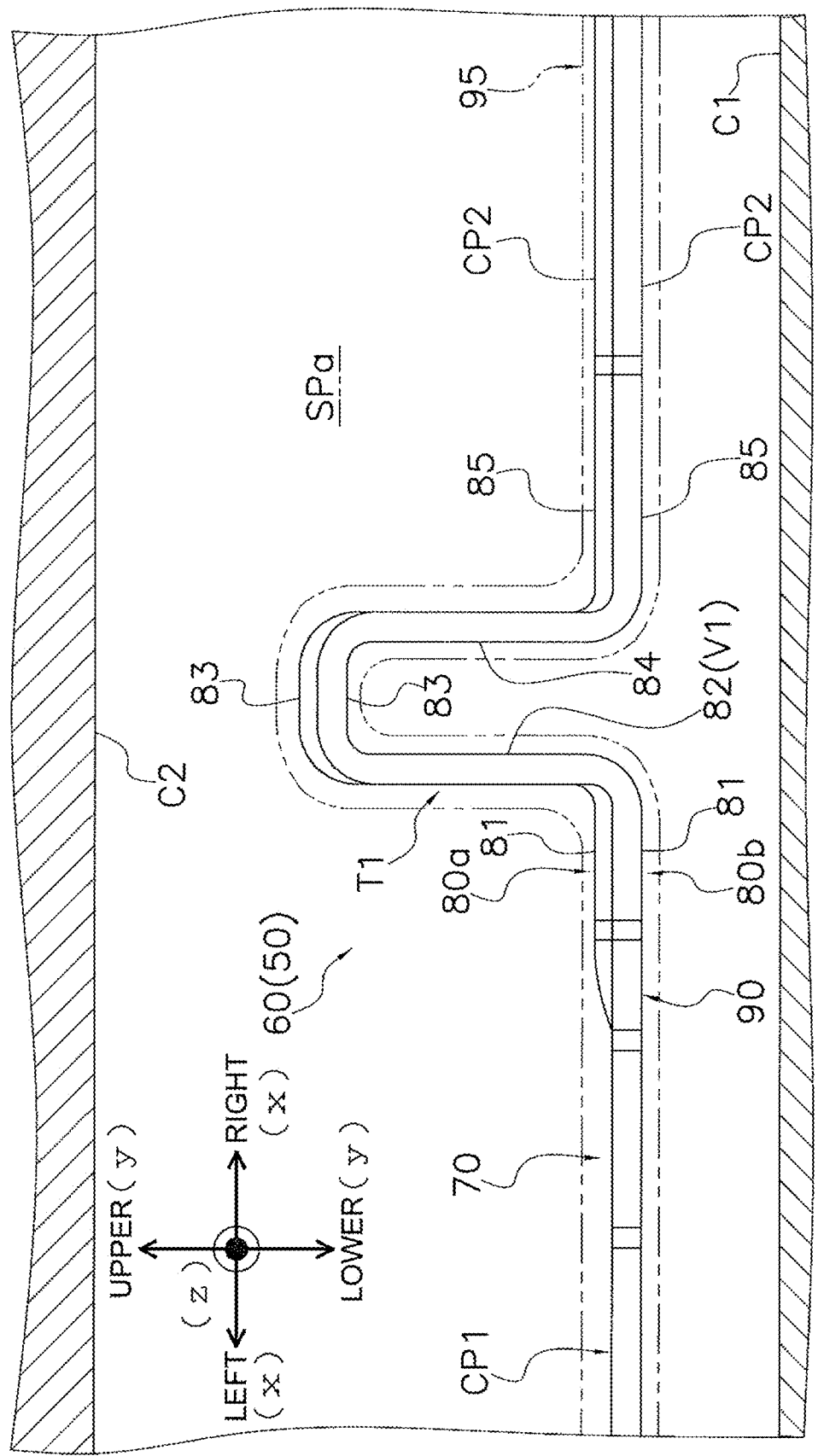
FIG. 7 is a diagrammatic view of an example of an installation form of the second branch pipe unit.

FIG. 6 is a diagrammatic view of an example of an installation form of the first branch pipe unit 51. FIG. 7 is a diagrammatic view of an example of an installation form of the second branch pipe unit 60. FIGS. 6 and 7 illustrate the examples of the installation of the branch pipe unit 50 in the space above a ceiling SPa (space above the ceiling of one of the target space SP). In FIGS. 6 and 7, upper, lower, left, and right directions are indicated. The left-right direction corresponds to the x direction indicated in FIGS. 4 and 5, and the up-down direction corresponds to the y direction indicated in FIGS. 4 and 5. Herein, the left-right direction is included in the horizontal direction, and the up-down direction is included in the vertical direction. That is, according to one or more embodiments, in the installation state of the branch pipe unit 50, the x direction corresponds to the horizontal direction, and the y direction corresponds to the vertical direction. Also, in FIGS. 6 and 7, the front-rear direction perpendicular to the left-right direction corresponds to the z direction indicated in FIG. 4 or 5 and is included in the horizontal direction.

The branch pipe unit 50 is installed together with the outdoor unit-side connection pipe CP1 and the indoor unit-side connection pipes CP2 in the space above a ceiling SPa. The space above a ceiling SPa is a narrow space formed between an upper surface of the ceiling of the target space SP (bottom surface of a space above a ceiling C1) and a floor of the upper space (top surface of a space above a ceiling C2) or a roof. The size of the space above a ceiling SPa is large in the horizontal direction and small in the vertical direction.

As illustrated in FIGS. 6 and 7, according to one or more embodiments, the first branch pipe unit 51 and the second branch pipe unit 60 are orientated such that the branch pipes (54, 80) are arranged in the horizontal direction (the z direction intersecting the extending direction x) and the extending directions of the branch pipes (54, 80) and the main pipes (52, 70) are coincident with each other (although the orientations of the both are different, both the directions are the horizontal direction). In relation to this, in the space above a ceiling SPa, the main extending direction of the indoor unit-side connection pipes CP2 (the left-right direction, that is, the horizontal direction herein) and the main extending direction of the outdoor unit-side connection pipe CP1 (the left-right direction, that is, the horizontal direction herein) are substantially coincident with each other. That is, in the space above a ceiling SPa having a small length in the vertical direction, the first branch pipe unit 51 and the second branch pipe unit 60 are orientated such that the main extending direction of the indoor unit-side connection pipes CP2 (the left-right direction, that is, the horizontal direction herein) and the main extending direction of the outdoor unit-side connection pipe CP1 (the left-right direction, that is, the horizontal direction herein) are substantially coincident with each other.

The outdoor unit-side connection pipe CP1 extends in the main extending direction of the indoor unit-side connection pipes CP2 (the right direction in FIGS. 6 and 7) and is coupled to a connection portion between the outdoor unit-side connection pipe CP1 and the first branch pipe unit 51 or the second branch pipe unit 60 (the one end 521 or 701 of the main pipe). Attachments (not illustrated) secured to the top surface C2 of a space above a ceiling are attached to the outdoor unit-side connection pipe CP1, the indoor unit-side connection pipes CP2, and either or both of the first branch pipe unit 51 and the second branch pipe unit 60, thereby the outdoor unit-side connection pipe CP1, the indoor unit-side connection pipes CP2, and either or both of the first branch pipe unit 51 and the second branch pipe unit 60 are hung in the space above a ceiling SPa. The outdoor unit-side connection pipe CP1, the indoor unit-side connection pipes CP2, and either or both of the first branch pipe unit 51 and the second branch pipe unit 60 are covered with a heat insulating material 95 for preventing condensation.

In FIG. 6, the first branch pipe unit 51 is installed in the space above a ceiling SPa in such an orientation that the main pipe 52 and the branch pipes 54 extend in the left-right direction (that is, the horizontal direction).

In FIG. 7, the second branch pipe unit 60 is installed in the space above a ceiling SPa in such an orientation that the main pipe 70 and the first extending portion 81, the folded back portion 83, and the fourth extending portion 85 of each of the branch pipes 80 extend in the left-right direction (that is, the horizontal direction) and the second extending portion 82 and the third extending portion 84 of each of the branch pipes 80 extend in the up-down direction (that is, in the vertical direction). Here, in the second branch pipe unit 60, the second extending portion 82 of the branch pipe 80 extends in the direction (y direction here) intersecting the extending direction of the main pipe 70 (intersecting perpendicularly to each other here). As illustrated in FIG. 7, the second extending portion 82 is oriented so as to extend upward. That is, the second extending portion 82 forms a "rise portion V1" (upward extending portion) that extends upward in the installed state.

The rise portion V1 (second extending portion 82) together with any or all of the other portions (81, 83 to 85) included in the branch pipe 80 functions as a trap portion T1. When the indoor unit 40 or the indoor units 40 in the operating state (operating indoor unit or operating indoor units) and the indoor unit 40 or the indoor units 40 in the operation-stopped state ("operation-stopped indoor unit" or "operation-stopped indoor units" hereinafter) coexist during the forward cycle state, the trap portion T1 prevents, regarding the refrigerant from the connection pipe portion 90, flowing of the refrigerant to the operation-stopped indoor unit or the operation-stopped indoor units.

(4) Functions of the Second Branch Pipe Unit 60

Figure 8:
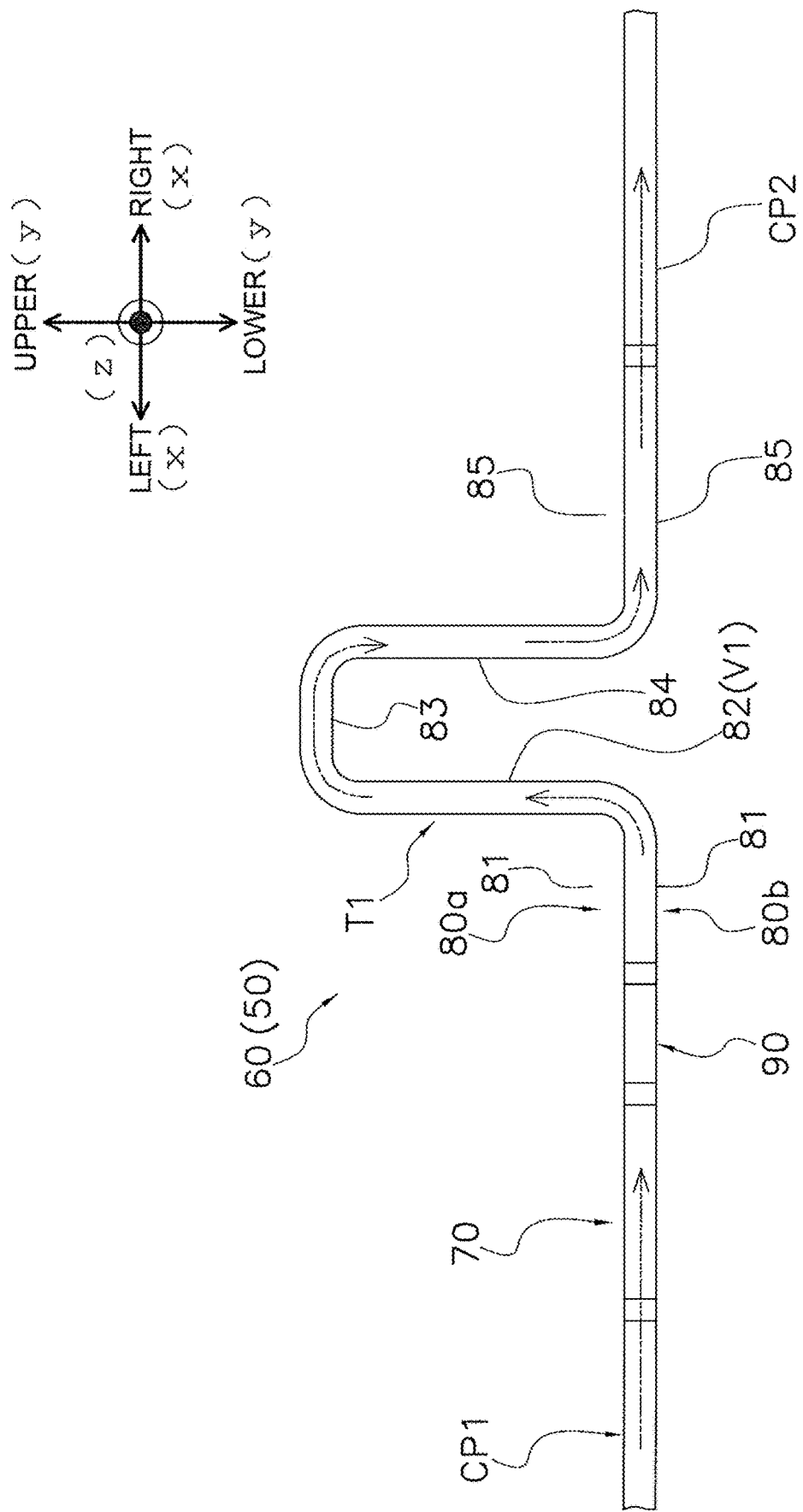
FIG. 8 is a diagrammatic view of an example of a flow of the refrigerant through the second branch pipe unit during the forward cycle operation.

The second branch pipe unit 60 also functions as a "trap forming unit" that forms the trap portion T1. During the forward cycle operation, the refrigerant flows through the second branch pipe unit 60 in a manner as illustrated in FIG. 8. FIG. 8 is a diagrammatic view of an example of the flow of the refrigerant through the second branch pipe unit 60 during the forward cycle operation. Two-dot chain-line arrows illustrated in FIG. 8 indicate a flowing direction of the refrigerant during the forward cycle operation. FIG. 8 illustrates only one of the branch pipes 80 of the branch pipe group 88.

In the second branch pipe unit 60, during the forward cycle operation, the refrigerant in the gas-liquid two-phase state flowing from the outdoor unit-side connection pipe CP1 flows into the main pipe 70. The refrigerant having flowed into the one end 701 of the main pipe 70 flows toward the other end 702 side (indoor unit 40 side) in the horizontal direction and flows into the connection pipe portion 90. The refrigerant having flowed into the first connection portion 901 of the connection pipe portion 90 is divided, flows toward the second connection portion 902 side, and flows into the branch pipes 80. The refrigerant having flowed into each of the branch pipes 80 that communicates with the operating indoor unit or the operating indoor units flows from the one end 801 side to the other end 802 side, and then flows into the indoor unit-side connection pipe CP2. In more detail, the refrigerant having flowed in the horizontal direction in the first extending portion 81 flows upward in the second extending portion 82 and flows into the folded back portion 83. The refrigerant having flowed into the folded back portion 83 is redirected to flow in the horizontal direction, redirected again to flow downward, and then flows into the third extending portion 84. The refrigerant having flowed into the third extending portion 84 flows downward, and then flows into the fourth extending portion 85. The refrigerant having flowed into the fourth extending portion 85 flows in the horizontal direction and flows into the indoor unit-side connection pipe CP2.

Figure 9:
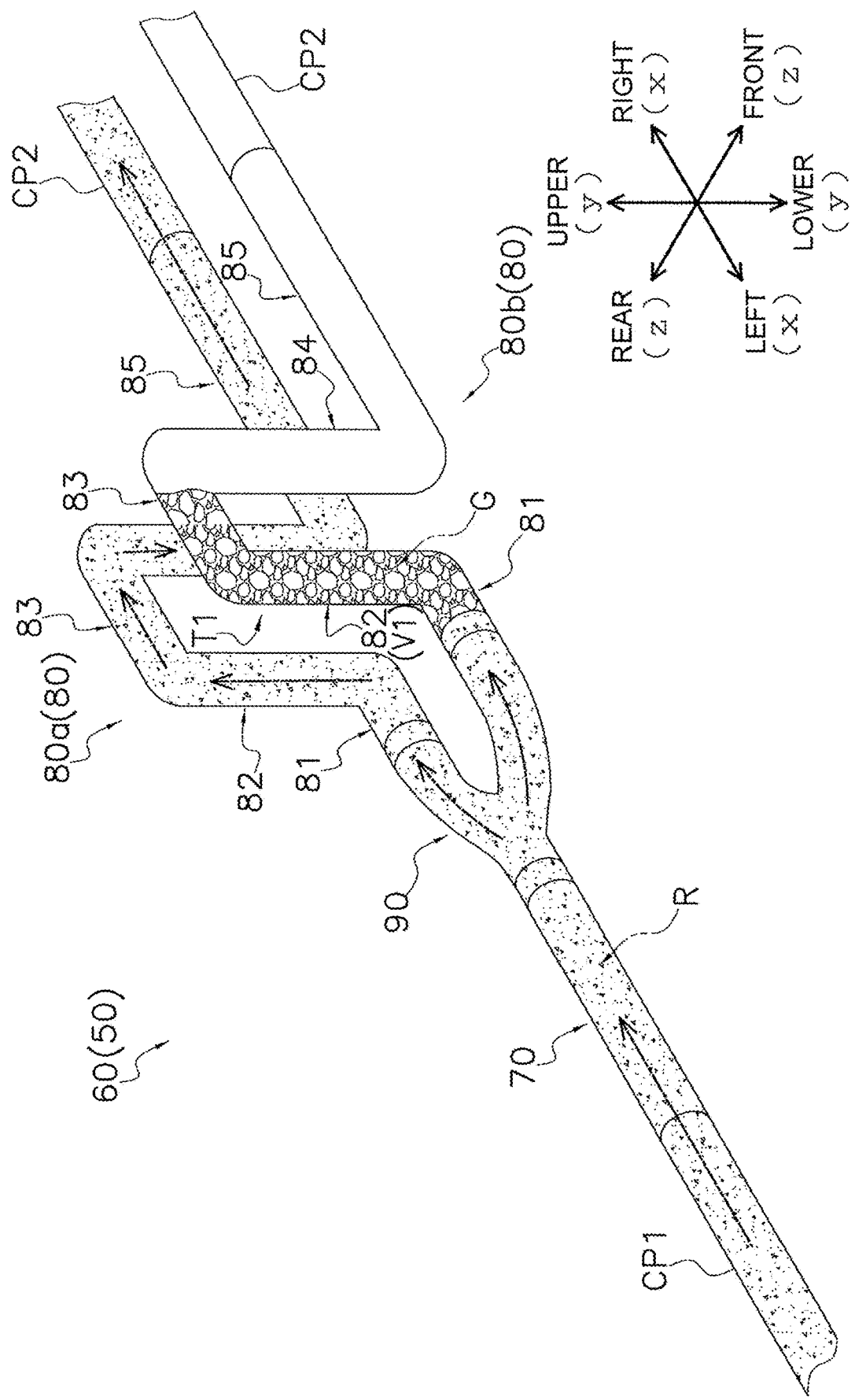
FIG. 9 is a diagrammatic view of an example of the flow of the refrigerant when operating and operation-stop indoor units coexist during the forward cycle operation.

When the operating and operation-stopped indoor units coexist during the forward cycle operation, the refrigerant flows through the second branch pipe unit 60 in a manner as illustrated in FIG. 9. FIG. 9 is a diagrammatic view of an example of the flow of the refrigerant when the operating and operation-stopped indoor units coexist during the forward cycle operation. In FIG. 9, a reference sign "R" indicates the refrigerant in the gas-liquid two-phase state and a reference sign "G" indicates the gas refrigerant (gas trap) that fills the trap portion T1. Two-dot chain-line arrows illustrated in FIG. 9 indicate the flowing direction of the refrigerant during the forward cycle operation.

When the operating and operation-stopped indoor units coexist during the forward cycle operation, the refrigerant in the gas-liquid two-phase state flowing from the outdoor unit-side connection pipe CP1 flows into the main pipe 70. The refrigerant having flowed into the main pipe 70 flows toward the indoor unit 40 side and flows into the connection pipe portion 90. The refrigerant having flowed into the connection pipe portion 90 is diverted and flows into the branch pipes 80. The refrigerant having flowed into one of the branch pipes 80 that communicates with the operating indoor unit (the branch pipe 80 on the rear side in FIG. 9) flows from the one end 801 side to the other end 802 side, and then flows into the indoor unit-side connection pipe CP2. Meanwhile, in the branch pipe 80 that communicates with the operation-stopped indoor unit (the branch pipe 80 on the front side in FIG. 9), the flow of the refrigerant having flowed into the one end 801 of the branch pipe 80 attenuates due to resistance of the trap portion T1 (mainly the rise portion V1 herein). In relation to this, the trap portion T1 is filled with the gas refrigerant of the refrigerant in the gas-liquid two-phase state (gas trap G). That is, the trap portion T1 causes the refrigerant in the gas state to fill therein. Thus, regarding the refrigerant in the gas-liquid two-phase state that has flowed into the one end 801 of the branch pipe 80, flowing of this refrigerant toward the other end 802 side is prevented.

As a result, flowing of the refrigerant toward the operation-stopped indoor unit side is prevented, and shortage of the amount of the circulating refrigerant in the operating indoor unit or the operating indoor units is prevented. That is, degradation of the performance of the operating indoor unit or the operating indoor units is prevented.

(5) Installation Location of the Second Branch Pipe Unit 60

When the operating and operation-stopped indoor units coexist during the forward cycle operation, the second branch pipe unit 60 functions as the "trap forming unit" that forms the trap portion T1 which is filled with the refrigerant in the gas state and which prevents flowing of the refrigerant in the gas-liquid two-phase state having flowed into the one end 801 of the branch pipe 80 to the other end 802 side. In the refrigerant circuit RC, the positions of the branch portion BP formed by the second branch pipe unit 60 are appropriately selected in accordance with the design specification and the installation environment. That is, in accordance with the installation form of the indoor units 40 included in the air conditioning system 100, the installation level or a branching form of the connection pipes, and so forth, the second branch pipe unit 60 is disposed at a position or positions in the refrigerant circuit RC where flowing of the refrigerant to the operation-stopped indoor unit side is effectively prevented, thereby shortage of the amount of the circulating refrigerant in the operating indoor unit or the operating indoor units is prevented when the operating and operation-stopped indoor units coexist during the forward cycle operation.

According to one or more embodiments, the second branch pipe unit 60 is disposed in one of the liquid-side branch portions BPa (a liquid-side branch portion BL1 illustrated in FIG. 2) located furthest toward the outdoor unit 10 side (that is, on the most upstream side during the forward cycle operation). Specifically, at the liquid-side branch portion BL1, the main pipe 70 is connected to the first liquid-side connection pipe L1, a first branch pipe 80a is connected to the second liquid-side connection pipe L2, and a second branch pipe 80b is connected to the third liquid-side connection pipe L3. Thus, even when, for example, out of a set of the indoor units 40 (specifically, 40a and 40b) installed in the target space SP1 and a set of the indoor units 40 (specifically, 40c and 40d) installed in the target space SP2, one of the sets of the indoor units 40 is in the operating state in the forward cycle operation and the other set of the indoor units 40 enters the operation stop state, flowing of the refrigerant toward the operation-stopped indoor unit side is prevented by the trap portion T1 of the branch pipe 80 communicating with the other set (operation-stopped indoor units) at the liquid-side branch portion BL1. In relation to this, shortage of the amount of the circulating refrigerant in the operating indoor units is prevented, and accordingly, degradation of reliability is prevented.

According to one or more embodiments, the first branch pipe 80a (see FIG. 9) located on the rear side in the installed state is connected to the second liquid-side connection pipe L2 (see FIGS. 1 and 2) that communicates with, for example, the indoor units 40a and 40b installed in the target space SP1. The second branch pipe 80b (see FIG. 9) disposed on the front side in the installed state is connected to the third liquid-side connection pipe L3 (see FIGS. 1 and 2) that communicates with, for example, the indoor units 40c and 40d installed in the target space SP2.

Instructions on the installation location of the second branch pipe unit 60 and a configuration form and configuration parts of the trap portion T1 are given by an installation manual or the like to service persons who perform work relating to the second branch pipe unit 60.

(6) Work Relating to the Second Branch Pipe Unit 60

The second branch pipe unit 60 is assembled in advance and delivered to a work site. The second branch pipe unit 60 is installed by being coupled to the other connection pipes (CP1, CP2) at the work site. In so doing, the branch pipe 80 is appropriately cut according to need so as to match the installation environment and the like and is coupled to the other connection pipes. Regarding the method of the work relating to the second branch pipe unit 60, instructions are given by the installation manual or the like to service persons who perform the work relating to the second branch pipe unit 60.

(7) Features (7-1)

The second branch pipe unit 60 according to the above-described embodiments facilitates improvement of work efficiency.

In a related-art air conditioning system having the outdoor unit and a plurality of indoor units, the liquid-side refrigerant channel between the outdoor unit and the indoor units are formed by connection piping. In this case, it is conceivable that, in some cases, traps are required to be provided in the connection piping depending on the design specification and the installation environment.

For example, typically, the connection piping includes the branch pipes the number of which corresponds to the number of the indoor units. However, when the installation level of a subset of the indoor units is lower than that of the other subset of the indoor units or a manner of work relating to the connection piping is restricted by the structure of the building (for example, a beam in the space above a ceiling), the installation level of a subset of branch pipes is lower than that of the other subset of the branch pipes or a subset of branch pipes is inclined downward more than the other subset of the branch pipes. In these cases, in order to prevent, for example, uneven flow or residence of the refrigerant, it is required that traps be provided in the connection piping.

For example, when the gas-liquid two-phase transport is performed as is the case with PTL 1, it is thought that, since the filling amount of the refrigerant is small than usual, a branch pipe communicating with an indoor unit in the operation stop state (operation-stopped indoor unit) is not filled with the refrigerant in the liquid state, and the refrigerant to be fed to an indoor unit in the operating state (operating indoor unit) flows from a branch portion into the branch pipe communicating with the operation-stopped indoor unit. Particularly, when the installation level of the branch pipe communicating with the operation-stopped indoor unit is lower than that of a branch pipe communicating with the operating indoor unit or the branch pipe communicating with the operation-stopped indoor unit is inclined downward more than the branch pipe communicating with the operating indoor unit, the refrigerant tends to flow to the branch pipe communicating with the operation-stopped indoor unit. Thus, when the gas-liquid two-phase transport is performed, it may be required that a trap be provided in the connection piping so as to prevent the occurrences of a situation in which the amount of the circulating refrigerant in the operating indoor unit is not correctly ensured due to flowing of the refrigerant into the operation-stopped indoor unit and residing of the refrigerant in the operation-stopped indoor unit.

Meanwhile, work relating to the connection piping is performed by service persons at the work site, and the connection piping is typically installed in a narrow space such as a space above a ceiling. Accordingly, it is conceivable that, in some cases, time and effort required for work for providing a trap at the work site tend to increase and work efficiency in not good.

The second branch pipe unit 60 (corresponding to a "pipe unit") according to the above-described embodiments is connected to the liquid-side connection piping La (corresponding to the "connection pipe"), forms, together with the liquid-side connection piping La, the liquid-side connection circuit RC3a (corresponding to the "liquid-side refrigerant channel"), allows the refrigerant to divide or merge, and includes a plurality of branch pipes 80 and the main pipe 70. The liquid-side connection piping La forms the liquid-side connection circuit RC3a between the outdoor unit 10 and the plurality of indoor units 40. The main pipe 70 communicates with the branch pipes 80. The main pipe 70 forms a channel through which the refrigerant flows to or from the branch pipes 80. In the installed state, the main pipe 70 is located on the outdoor unit 10 side of the branch pipes 80 in the liquid-side connection circuit RC3a. The main pipe 70 includes the first main pipe portion 71 (corresponding to a "first part"). The first main pipe portion 71 extends in the x direction (corresponding to the "first direction"). At least one of the branch pipes 80 includes the second extending portion 82 (corresponding to the "second part"). The second extending portion 82 extends in the y direction (corresponding to the "second direction"). The y direction intersects the x direction. The x direction is the horizontal direction in the installed state. The y direction is the vertical direction in the installed state.

The second branch pipe unit 60 according to the above-described embodiments forms the liquid-side connection circuit RC3a together with the liquid-side connection piping La between the outdoor unit 10 and the plurality of indoor units 40. The main pipe 70 includes the first main pipe portion 71 extending in the x direction (horizontal direction in the installed state). The at least one of the branch pipes 80 includes the second extending portion 82 extending in the y direction (vertical direction in the installed state) intersecting the x direction. Thus, in the installed state, the second extending portion 82 of the branch pipe 80 extends in the vertical direction and can function as the trap portion T1 (trap). That is, the trap portion T1 is easily formed by appropriately connecting the main pipe 70 and each of the branch pipes 80 of the second branch pipe unit 60 having the function of the "trap forming unit" to the liquid-side connection piping La at the work site. Accordingly, when it is required to provide the trap portion T1 in the liquid-side connection piping La forming a liquid-side connection channel, work for bending or connecting pipes so as to form the trap portion T1 at the work site is reduced. As a result, even when the liquid-side connection piping La is installed in a narrow space, time and effort required for work for providing the trap portion T1 are reduced. This facilitates the improvement of work efficiency.

Herein, the term "extending in the x direction" is not necessarily limited to a state in which the extending direction is coincident with the x direction (horizontal direction in the installed state). The term "extending in the x direction" also includes a state in which the extending direction is slightly inclined relative to the x direction. For example, extending while being inclined within a range of a predetermined angle (for example, 30 degrees) relative to the x direction is regarded as "extending in the x direction".

The term "extending in the y direction" is not necessarily limited to a state in which the extending direction is coincident with the y direction (vertical direction in the installed state). The term "extending in the y direction" also includes a state in which the extending direction is slightly inclined relative to the y direction. For example, extending while being inclined within a range of a predetermined angle (for example, 30 degrees) relative to the y direction is regarded as "extending in the y direction".

(7-2)

According to the above-described embodiments, the at least one of the branch pipes 80 includes the third extending portion 84 (corresponding to the "indoor unit-side vertical branch pipe part") and the folded back portion 83 (corresponding to the "folded back part"). In the installed state, the third extending portion 84 is located on the indoor unit 40 side of the second extending portion 82 (corresponding to the "second part") in the liquid-side connection circuit RC3a (corresponding to the "liquid-side refrigerant channel"). The third extending portion 84 extends in the y direction. In the installed state, the folded back portion 83 is located between the second extending portion 82 and the third extending portion 84 in the liquid-side connection circuit RC3a. The folded back portion 83 connects the second extending portion 82 and the third extending portion 84 to each other. This particularly reduces time and effort required for work for providing the trap portion T1. This particularly facilitates the improvement of work efficiency.

(7-3)

According to the above-described embodiments, the at least one of the branch pipes 80 includes the fourth extending portion 85 (corresponding to the "horizontal branch pipe part"). In the installed state, the fourth extending portion 85 is located on the indoor unit 40 side of the third extending portion 84 (corresponding to the "indoor unit-side vertical branch pipe part") in the liquid-side connection circuit RC3a (corresponding to the "liquid-side refrigerant channel"). The fourth extending portion 85 extends in the x direction. This allows an end portion of the main pipe 70 and end portions of the branch pipes 80 of the second branch pipe unit 60 to be connected at the work site to the liquid-side connection piping La (CP1, CP2) extending in the horizontal direction.

Thus, when the liquid-side connection piping La is installed in a narrow space, time and effort required for work for providing the trap portion T1 particularly are reduced. This particularly facilitates the improvement of work efficiency.

(7-4)

According to the above-described embodiments, the at least one of the branch pipes 80 includes the first extending portion 81 (corresponding to the "fifth part"). In the installed state, the first extending portion 81 is located on the outdoor unit 10 side of the second extending portion 82 (corresponding to the "second part") in the liquid-side connection circuit RC3a (corresponding to the "liquid-side refrigerant channel"). The first extending portion 81 extends in the x direction. This particularly reduces time and effort required for work for providing the trap portion T1. This particularly facilitates the improvement of work efficiency.

(7-5)

According to the above-described embodiments, the x direction and the y direction intersect substantially at right angles to each other. Thus, the trap portion T1 is more easily formed by connecting the liquid-side connection piping La to the main pipe 70 and each of the branch pipes 80. Thus, even when the liquid-side connection piping La is installed in a narrow space, time and effort required for work for providing the trap portion T1 are particularly reduced. This particularly facilitates the improvement of work efficiency.

The term "intersect at substantially right angles" herein refers not only to a case where the x direction and the y direction intersect at 90 degrees to each other but also to a case where the x direction and the y direction intersect at an angle slightly different from 90 degrees each other. Specifically, when the x direction and the y direction intersect at an angle within a predetermined angle range (for example, greater than or equal to 60 degrees and smaller than or equal to 120 degrees) to each other, the first direction and the second direction are regarded as "intersect at substantially right angles".

(7-6)

According to the above-described embodiments, the size of the branch pipes 80 is greater than or equal to two bus and smaller than or equal to six bus. This increases ease of forming the trap portion T1 when, as the pipes included in the liquid-side connection circuit RC3a (liquid-side refrigerant channel), the branch pipes 80 having a general size are used to form a liquid refrigerant channel.

(7-7)

According to the above-described embodiments, the refrigerant that flows from the outdoor unit 10 to the indoor units 40 through the liquid-side connection circuit RC3a (corresponding to the "liquid-side refrigerant channel") flows into the liquid-side connection circuit RC3a in the gas-liquid two-phase state. Thus, in an air conditioning system performing gas-liquid two-phase transport (that is, when it is required to provide the trap portion T1 in the liquid-side connection piping La), time and effort required for work for providing the trap portion T1 are reduced. This facilitates the improvement of work efficiency.

(7-8)

The air conditioning system 100 according to the above-described embodiments includes the outdoor unit 10, the plurality of indoor units 40, the liquid-side connection piping La (corresponding to the "connection pipe"), and the second branch pipe unit 60 (corresponding to the "pipe unit").

(8) Variations

The above-described embodiments can be appropriately varied as described in the following variations. For example, each of the variations may be applied by being combined with another variation as long as consistency is maintained.

(8-1) Variation 1

In the second branch pipe unit 60 according to the above-described embodiments, each of the branch pipes 80 (the first branch pipe 80a and the second branch pipe 80b) included in the branch pipe group 88 has the first extending portion 81, the second extending portion 82, the folded back portion 83, the third extending portion 84, and the fourth extending portion 85. That is, the rise portion V1 (that is, the trap portion T1) is disposed in each of the branch pipes 80. However, not all the branch pipes 80 are necessarily have the first extending portion 81, the second extending portion 82, the folded back portion 83, the third extending portion 84, or the fourth extending portion 85. That is, not all the branch pipes 80 necessarily have the rise portion V1 (that is, the trap portion T1).

Figure 10:
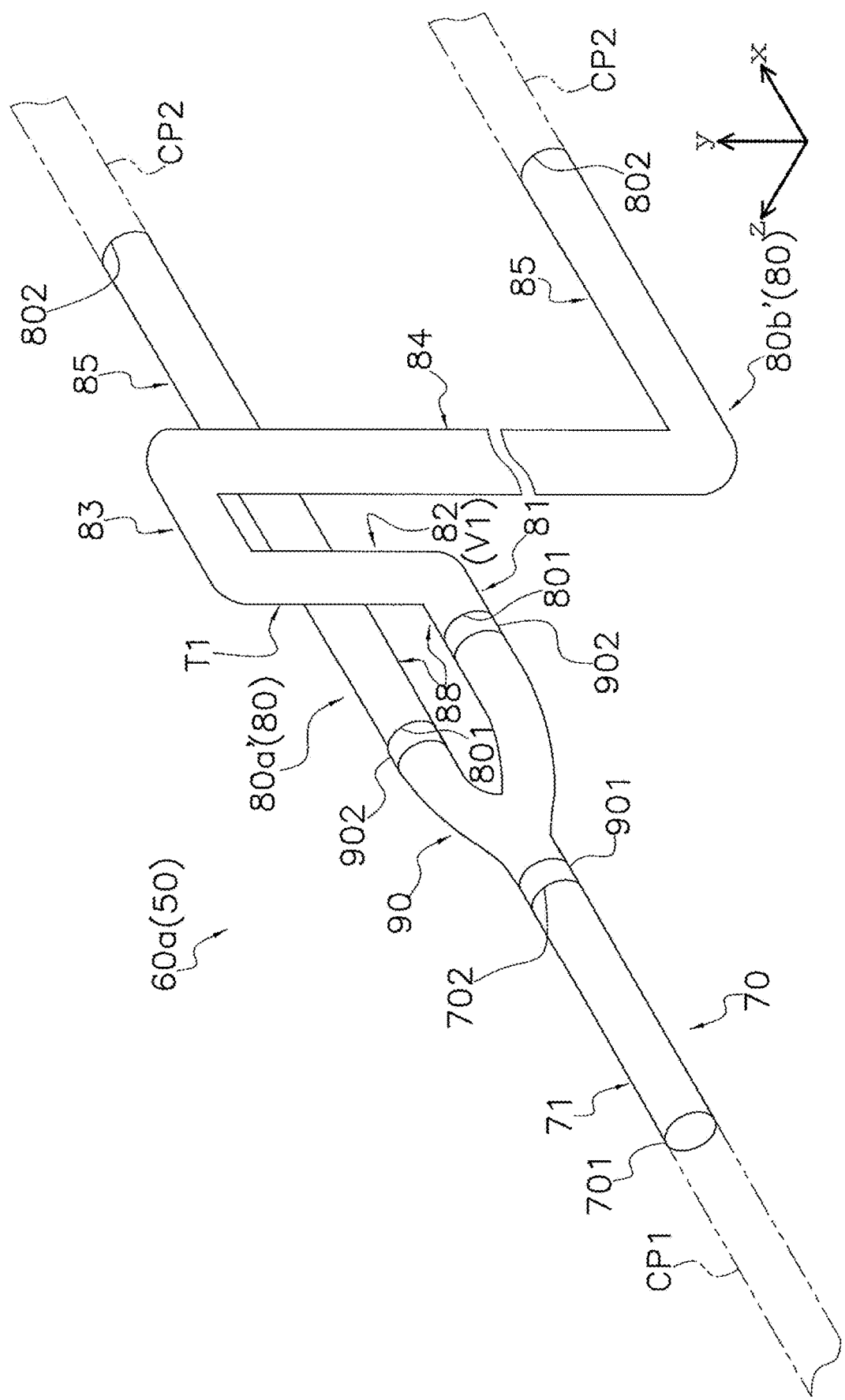
FIG. 10 is a schematic view of a second branch pipe unit according to variation 1.

For example, the second branch pipe unit 60 may have a configuration similar to that of a second branch pipe unit 60a (corresponding to a "branch pipe unit") illustrated in FIG. 10. FIG. 10 is a schematic view of the second branch pipe unit 60a. Two-dot chain-line arrows illustrated in FIG. 10 indicate the flowing direction of the refrigerant during the forward cycle operation. Portions of the second branch pipe unit 60a different from those of the second branch pipe unit 60 are described below.

The second branch pipe unit 60a has a first branch pipe 80a' and a second branch pipe 80b' instead of the first branch pipe 80a and the second branch pipe 80b. Unlike the first branch pipe 80a, the first branch pipe 80a' does not have the first extending portion 81, the second extending portion 82, the folded back portion 83, the third extending portion 84, or the fourth extending portion 85. In relation to this, the rise portion V1 (that is, the trap portion T1) is not disposed in the first branch pipe 80a'.

Furthermore, the dimension of the third extending portion 84 of the second branch pipe 80b' is greater than that of the second branch pipe 80b in the y direction. In relation to this, in the installed state, the installation level of the fourth extending portion 85 and the indoor unit-side connection pipe CP2 connected to the fourth extending portion 85 is lower than the installation level of the first branch pipe 80a'. That is, the second branch pipe 80b' has a portion the installation level of which is lower than the first branch pipe 80a'. That is, the second branch pipe unit 60a is configured such that, out of the branch pipe group 88, the trap portion T1 is provided in one of the branch pipes 80 (second branch pipe 80b') that includes a portion the installation level of which is lower than the installation level of the other branch pipe 80 (first branch pipe 80a').

Also when such a second branch pipe unit 60a is disposed instead of the second branch pipe unit 60, in the case where a subset of the indoor units 40 is in the operating state and the other subset of the indoor units 40 is in the operation stop state, the gas refrigerant fills the trap portion T1 (of second branch pipe 80b' communicating with the operation-stopped indoor unit 40 or the operation-stopped indoor units 40). Particularly, even when the installation level of the branch pipe 80 communicating with the operation-stopped indoor unit or the operation-stopped indoor units (the second branch pipe 80b' here) is lower than the installation level of the branch pipe 80 communicating with the operating unit or the operating units (the first branch pipe 80a' here) or the branch pipe 80 communicating with the operation-stopped indoor unit or the operation-stopped indoor units is inclined downward more than the branch pipe 80 communicating with the operating unit or the operating units, flowing of the refrigerant into the branch pipe 80 communicating with the operation-stopped indoor unit or the operation-stopped indoor units (the second branch pipe 80b' here) is appropriately prevented. As a result, flowing of the refrigerant toward the operation-stopped indoor unit or the operation-stopped indoor units communicating with the second branch pipe 80b' is prevented. Accordingly, shortage of the amount of the circulating refrigerant in the operating indoor unit or the operating indoor units communicating with the first branch pipe 80a' is prevented.

When the second branch pipe unit 60a is used, the trap portion T1 can be easily formed at the work site. Thus, even when the liquid-side connection piping La is installed in a narrow space, time and effort required for work for providing the trap portion T1 are reduced. This facilitates the improvement of work efficiency.

Likewise, not all the branch pipes 80 of second branch pipe units 60b to 60g (see FIGS. 11 to 18), which will be described later, necessarily have the rise portion V1 (that is, the trap portion T1).

(8-2) Variation 2

Figure 11:
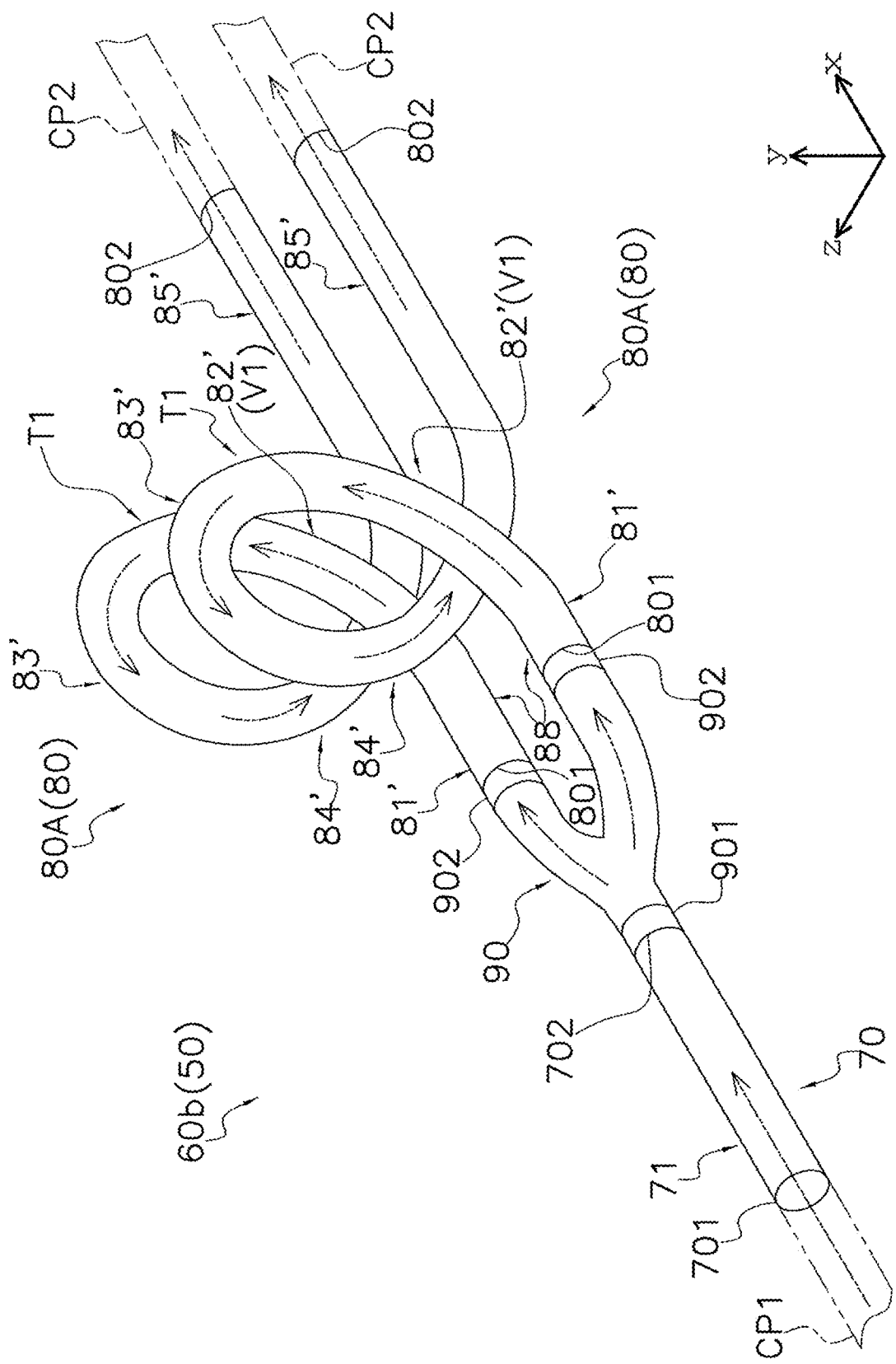
FIG. 11 is a schematic view of a second branch pipe unit according to variation 2.

For example, the second branch pipe unit 60 may have a configuration similar to that of a second branch pipe unit 60b illustrated in FIG. 11. FIG. 11 is a schematic view of the second branch pipe unit 60b. Two-dot chain-line arrows illustrated in FIG. 11 indicate the flowing direction of the refrigerant during the forward cycle operation. Portions of the second branch pipe unit 60b different from those of the second branch pipe unit 60 are described below.

The branch pipe group 88 of the second branch pipe unit 60b has branch pipes 80A instead of the branch pipes 80. Unlike the branch pipes 80, each of the branch pipes 80A has a first extending portion 81', a second extending portion 82', a folded back portion 83', a third extending portion 84', and a fourth extending portion 85'. In the branch pipe 80A, an inclination angle of the second extending portion 82' relative to the x direction is smaller than that of the second extending portion 82 of the branch pipe 80. Also, an inclination angle of the third extending portion 84' relative to the x direction is smaller than that of the third extending portion 84 of the branch pipe 80. In this regard, the branch pipe 80A is folded back so as to form a helical shape. That is, the first extending portion 81', the second extending portion 82', the folded back portion 83', the third extending portion 84', and the fourth extending portion 85' are formed such that the branch pipe 80A is folded back by 360 degrees between the one end 801 and the other end 802. In relation to this, the trap portion T1 including the rise portion V1 is formed.

Also in the case where the second branch pipe unit 60b as described above is disposed instead of the second branch pipe unit 60, the similar effects to those of the above-described embodiments are produced.

In the second branch pipe unit 60b, at least one of the branch pipes 80A is folded back so as to form a helical shape. This allows an end portion of the main pipe 70 on the outdoor unit 10 side and end portions of the branch pipes 80A on the indoor unit 40 side of the second branch pipe unit 60 to be connected at the work site to the liquid-side connection piping La (CP1, CP2) extending in the horizontal direction. Thus, when the liquid-side connection piping La is installed in a narrow space, time and effort required for work for providing the trap portion T1 are particularly reduced. This particularly facilitates the improvement of work efficiency.

(8-3) Variation 3

Figure 12:
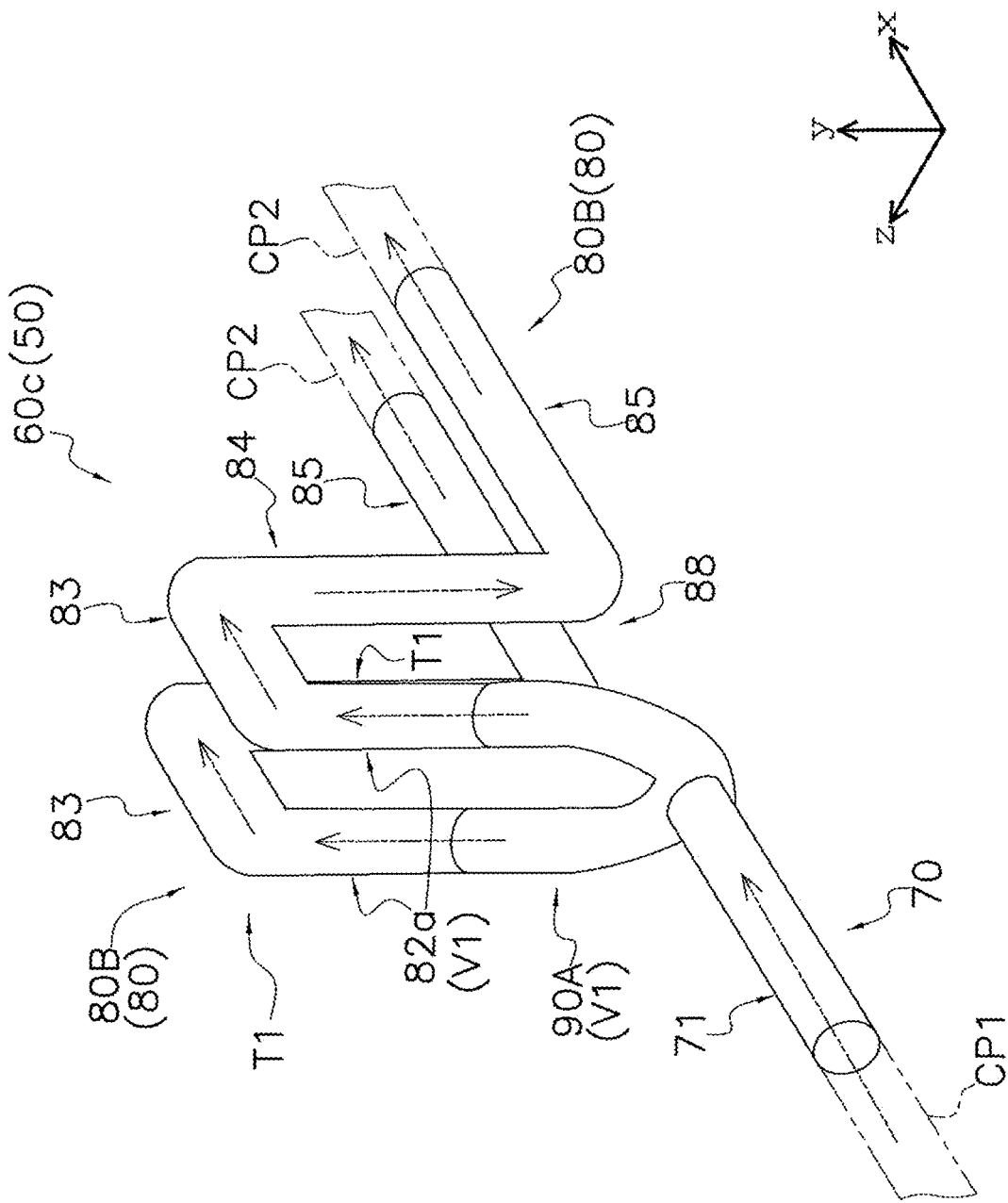
FIG. 12 is a schematic view of a second branch pipe unit according to variation 3.

For example, the second branch pipe unit 60 may have a configuration similar to that of a second branch pipe unit 60c illustrated in FIG. 12. FIG. 12 is a schematic view of the second branch pipe unit 60c. Two-dot chain-line arrows illustrated in FIG. 12 indicate the flowing direction of the refrigerant during the forward cycle operation. Portions of the second branch pipe unit 60c different from those of the second branch pipe unit 60 are described below.

The second branch pipe unit 60c has a connection pipe portion 90A instead of the connection pipe portion 90. Unlike the connection pipe portion 90, the connection pipe portion 90A is disposed so as to extend in the y direction (that is, a direction intersecting the extending direction of the main pipe 70 and directed upward in the installed state). That is, the connection pipe portion 90A is connected to the main pipe 70 and the branch pipe group 88 such that the connection pipe portion 90A has a substantially U shape or a substantially C shape when seen from the x direction.

The branch pipe group 88 of the second branch pipe unit 60c has branch pipes 80B instead of the branch pipes 80. Unlike the branch pipes 80, each of the branch pipes 80B does not have the first extending portion 81. Furthermore, each of the branch pipes 80B has a second extending portion 82a (corresponding to an "outdoor unit-side vertical branch pipe part" in the claims) having a smaller dimension in the y direction than that of the second extending portion 82 instead of the second extending portion 82.

In the second branch pipe unit 60c, the rise portions V1 and the trap portions T1 are formed by the connection pipe portion 90A together with the branch pipes 80B. That is, in the second branch pipe unit 60c, the extending direction of the main pipe 70 is the x direction (horizontal direction in the installed state), the extending direction of the connection pipe portion 90A is the y direction (vertical direction in the installed state), and the rise portions V1 extend over the connection pipe portion 90A and the corresponding branch pipes 80B. Also in the case where the second branch pipe unit 60c as described above is disposed instead of the second branch pipe unit 60, the similar effects to those of the above-described embodiments are produced.

(8-4) Variation 4

Figure 13:
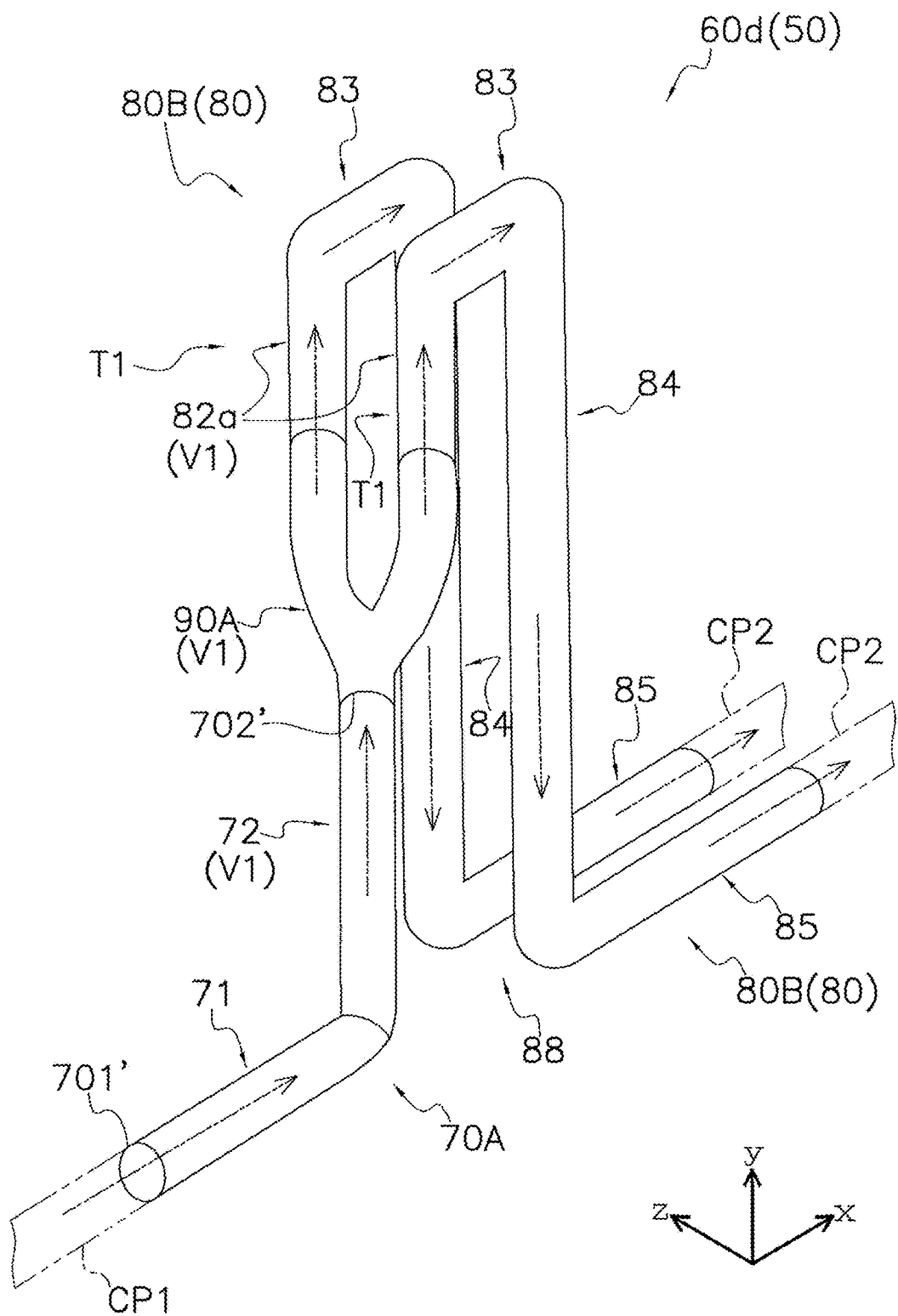
FIG. 13 is a schematic view of a second branch pipe unit according to variation 4.

For example, the second branch pipe unit 60c may have a configuration similar to that of a second branch pipe unit 60d illustrated in FIG. 13. FIG. 13 is a schematic view of the second branch pipe unit 60d. Two-dot chain-line arrows illustrated in FIG. 13 indicate the flowing direction of the refrigerant during the forward cycle operation. Portions of the second branch pipe unit 60d different from those of the second branch pipe unit 60c are described below.

The second branch pipe unit 60d has a main pipe 70A instead of the main pipe 70. The main pipe 70A has a first main pipe portion 71 and a second main pipe portion 72 (corresponding to a "vertical main pipe part" described in the claims). The first main pipe portion 71 extends in the x direction ("horizontal direction" in the installed state). The second main pipe portion 72 extends in the y direction ("vertical direction" in the installed state). A proximal end of the first main pipe portion 71 forms one end 701' of the main pipe 70A and is connected to the outdoor unit-side connection pipe CP1 in the installed state. A distal end of the first main pipe portion 71 is connected to a proximal end of the second main pipe portion 72. The second main pipe portion 72 is located between the first main pipe portion 71 and the connection pipe portion 90A and the second extending portions 82a (corresponding to the "outdoor unit-side vertical branch pipe part"). A distal end of the second main pipe portion 72 forms another end 702' of the main pipe 70A and is connected to the connection pipe portion 90A. That is, the main pipe 70A extends in the x direction from the one end

701'. Then, the main pipe 70A extends in the y direction and is connected to the connection pipe portion 90A. In relation to this, in the second branch pipe unit 60d, the rise portions V1 and the trap portions T1 are formed by the branch pipes 80B, the connection pipe portion 90A, and the main pipe 70A (second main pipe portion 72). That is, in the second branch pipe unit 60d, the extending direction of the main pipe 70A and the connection pipe portion 90A is the y direction (vertical direction in the installed state), and the rise portions V1 extend over the main pipe 70A, the connection pipe portion 90A and the corresponding branch pipes 80B.

The main pipe 70A of the second branch pipe unit 60d includes the second main pipe portion 72 (corresponding to the "vertical main pipe part") extending in the y direction, and the second main pipe portion 72 is located between the first main pipe portion 71 (corresponding to the "first part") and the second extending portion 82a (corresponding to the "outdoor unit-side vertical branch pipe part"). Also in the case where the second branch pipe unit 60d as described above is disposed instead of the second branch pipe unit 60, the similar effects to those of the above-described embodiments are produced.

Figure 14:
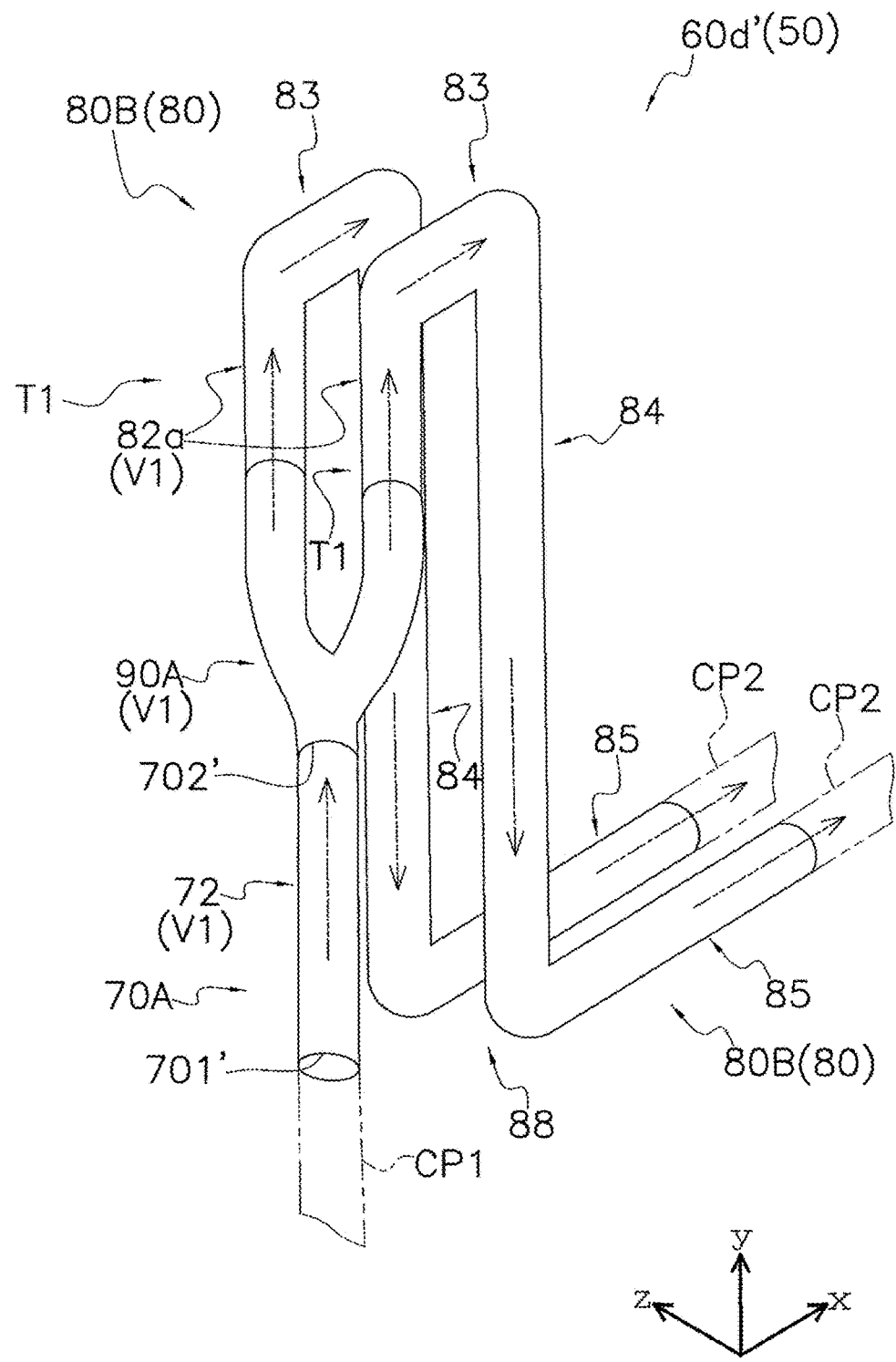
FIG. 14 is a schematic view of another example relating to the second branch pipe unit according to variation 4.

As is the case with, for example, the second branch pipe unit 60d' illustrated in FIG. 14, the first main pipe portion 71 may be omitted from the main pipe 70A of the second branch pipe unit 60d. In this case, the proximal end of the second main pipe portion 72 forms the one end 701' of the main pipe 70A and is connected to the outdoor unit-side connection pipe CP1 in the installed state.

(8-5) Variation 5

Figure 15:
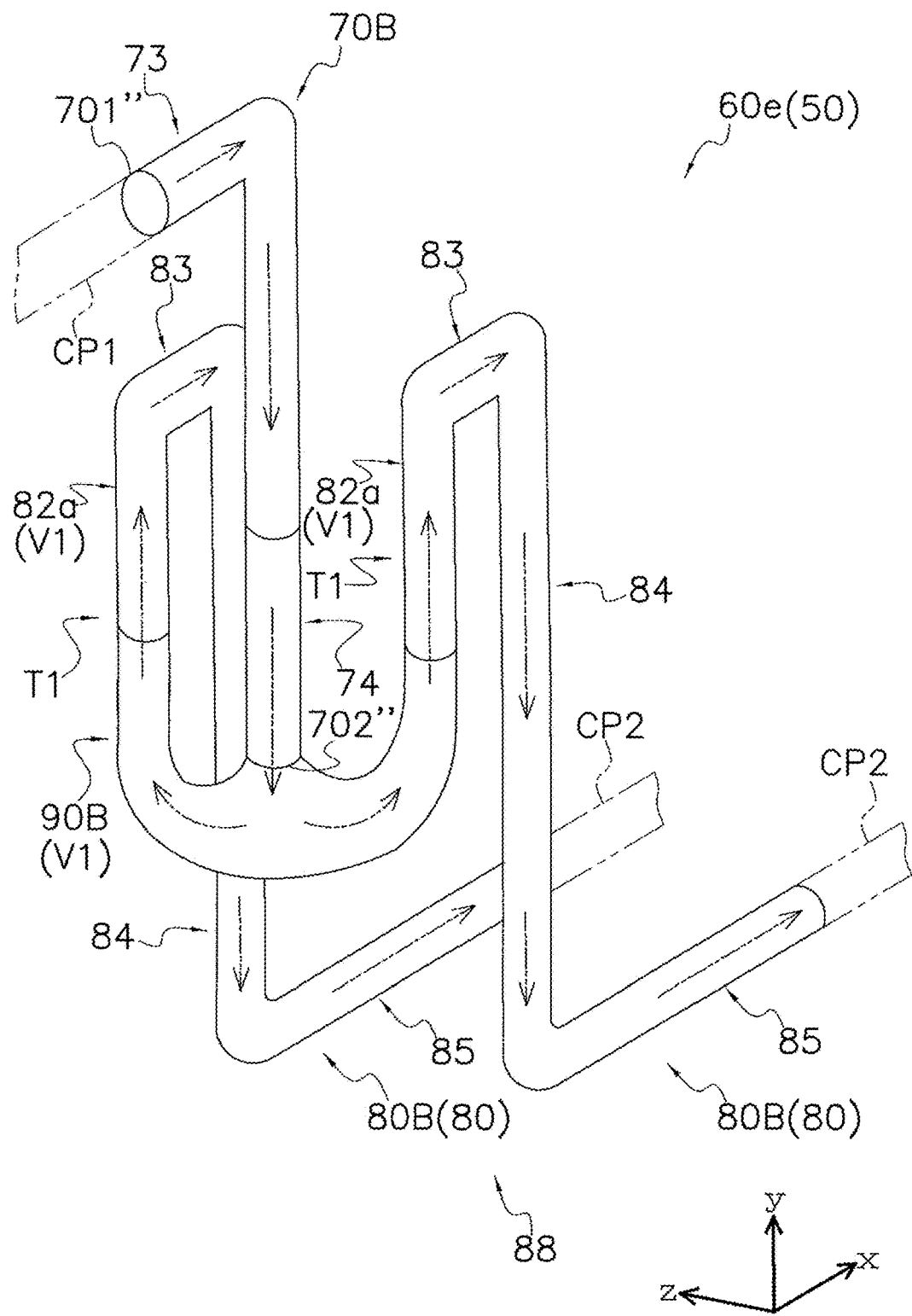
FIG. 15 is a schematic view of a second branch pipe unit according to variation 5.

For example, the second branch pipe unit 60d may have a configuration similar to that of a second branch pipe unit 60e illustrated in FIG. 15. FIG. 15 is a schematic view of the second branch pipe unit 60e. Two-dot chain-line arrows illustrated in FIG. 15 indicate the flowing direction of the refrigerant during the forward cycle operation. Portions of the second branch pipe unit 60e different from those of the second branch pipe unit 60d are described below.

The second branch pipe unit 60e has a main pipe 70B instead of the main pipe 70A and has a connection pipe portion 90B (corresponding to the "connecting pipe" described in the claims) instead of the connection pipe portion 90A.

The main pipe 70B has a third main pipe portion 73 (corresponding to a "horizontal main pipe part" and the "vertical main pipe part" described in the claims) and a fourth main pipe portion 74 (corresponding to the "vertical main pipe part" described in the claims). The third main pipe portion 73 extends in the x direction ("horizontal direction" in the installed state), and then extends in the y direction (downward in the installed state). The fourth main pipe portion 74 extends in the y direction (downward in the installed state) at a position further toward the branch pipe group 88 side than the third main pipe portion 73. A proximal end of the third main pipe portion 73 forms one end 701" of the main pipe 70B and is connected to the outdoor unit-side connection pipe CP1 in the installed state. A distal end of the third main pipe portion 73 is connected to a proximal end of the fourth main pipe portion 74. A distal end of the fourth main pipe portion 74 forms another end 702" of the main pipe 70B and is connected to the connection pipe portion 90B (a portion between both end portions 902' of the connection pipe portion 90B). That is, the main pipe 70B extends in the x direction from the one end 701".

Then, the main pipe 70B extends in the y direction and is connected to the connection pipe portion 90B at the other end 702".

Figure 16:
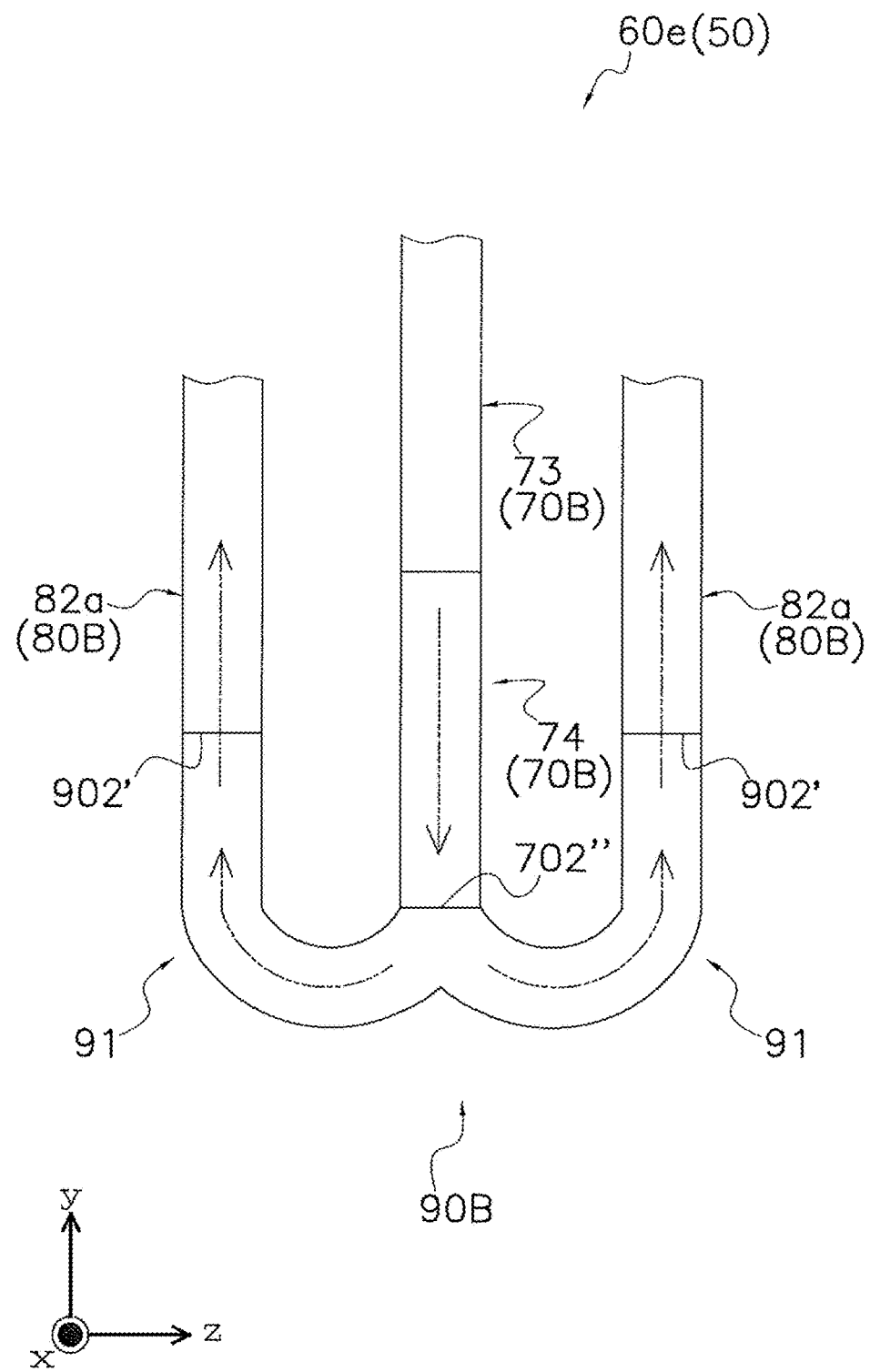
FIG. 16 is an enlarged view of a region around a connection pipe portion of a second branch pipe unit according to variation 5.

FIG. 16 is an enlarged view of a region around the connection pipe portion 90B of the second branch pipe unit 60e. As illustrated in FIG. 16, the connection pipe portion 90B has connection pipe extending portions 91. The connection pipe extending portions 91 extend in the x direction and/or the z direction (horizontal direction in the installed state) and branch off in accordance with the number of the branch pipes 80B included in the branch pipe group 88. Then, the connection pipe extending portions 91 are folded back to the y direction (upward in the installed state) and extend at branched portions, and the connection pipe extending portions 91 are connected to the second extending portions 82a of the branch pipes 80B. The connection pipe extending portions 91 fold back upward the refrigerant flowing from the main pipe 70B in the second branch pipe unit 60e. The connection pipe portion 90B has the plurality of end portions 902'. At each of the end portions 902', the connection pipe portion 90B is connected to the second extending portion 82a of any of the branch pipes 80B. The connection pipe portion 90B connects proximal ends (end portions on the main pipe 70 side) of the branch pipes 80B included in the branch pipe group 88 to each other.

In the second branch pipe unit 60e, the rise portions V1 and the trap portions T1 are formed by the branch pipes 80B and the connection pipe portion 90B (connection pipe extending portions 91). That is, in the second branch pipe unit 60e, the main pipe 70B extends in the y direction (downward in the installed state), the connection pipe portion 90B includes the connection pipe extending portions 91 that fold back upward the refrigerant flowing from the main pipe 70B, and each of the rise portions V1 extends over the connection pipe portion 90B and a corresponding one of the branch pipes 80B.

The second branch pipe unit 60e includes the connection pipe portion 90B (corresponding to the "connecting pipe"). Each of the branch pipes 80 of the second branch pipe unit 60e includes the second extending portion 82a (corresponding to the "outdoor unit-side vertical branch pipe part"). The connection pipe portion 90B connects end portions of the second extending portions 82a on the outdoor unit 10 side to each other. The main pipe 70 includes the fourth main pipe portion 74 (corresponding to the "vertical main pipe part"). In the installed state, the fourth main pipe portion 74 is located on the indoor unit 40 side of the first main pipe portion 71 in the liquid-side connection circuit RC3a (corresponding to the "liquid-side refrigerant channel"). The connection pipe portion 90B extends in the x direction. The connection pipe portion 90B has the plurality of end portions 902'. Each of the end portions 902' of the connection pipe portion 90B is connected to any of the second extending portions 82a. The fourth main pipe portion 74 extends in the y direction. The end portion of the fourth main pipe portion 74 on the indoor unit 40 side is connected to the portion between the end portions of the connection pipe portion 90B. In the installed state, the refrigerant flowing from the outdoor unit 10 to the indoor units 40 flows downward through the fourth main pipe portion 74. In the installed state, the refrigerant flowing from the outdoor unit 10 to the indoor units 40 flows upward through the second extending portions 82a. Also in the case where the second branch pipe unit 60e as described above is disposed instead of the second branch pipe unit 60, the similar effects to those of the above-described embodiments are produced.

(8-6) Variation 6

Figure 17:
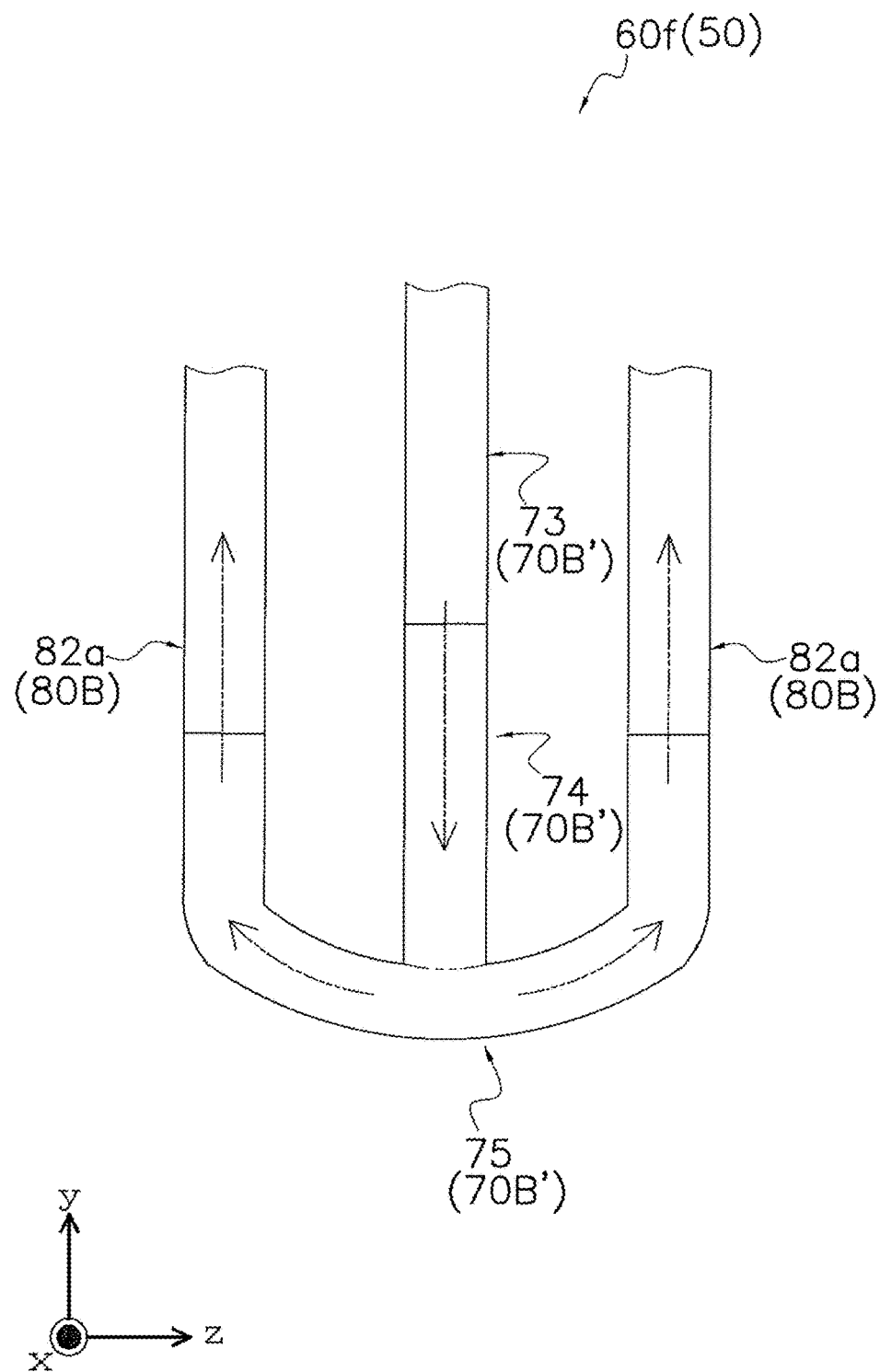
FIG. 17 is an enlarged view of a region around a connection pipe portion of a second branch pipe unit according to variation 6.

For example, the second branch pipe unit 60e may have a configuration similar to that of a second branch pipe unit 60f illustrated in FIG. 17. FIG. 17 is a schematic view of the second branch pipe unit 60f. Two-dot chain-line arrows illustrated in FIG. 17 indicate the flowing direction of the refrigerant during the forward cycle operation. Portions of the second branch pipe unit 60f different from those of the second branch pipe unit 60e are described below.

Unlike the second branch pipe unit 60e, the connection pipe portion 90B is omitted in the second branch pipe unit 60f. The second branch pipe unit 60f has a main pipe 70B' instead of the main pipe 70B. The main pipe 70B' has a fifth main pipe portion 75 in addition to the third main pipe portion 73 and the fourth main pipe portion 74. The fifth main pipe portion 75 extends in the y direction (downward in the installed state) at a position further toward the branch pipe group 88 side than the third main pipe portion 73. Then, the fifth main pipe portion 75 extends in the x direction and/or the z direction (horizontal direction in the installed state) and branches off in accordance with the number of the branch pipes 80B included in the branch pipe group 88. Then, the fifth main pipe portion 75 is folded back to the y direction (upward in the installed state) and extends at branched portions, and the fifth main pipe portion 75 is connected to the second extending portions 82a of the branch pipes 80B. The fifth main pipe portion 75 of the second branch pipe unit 60f includes a portion extending in the x direction and corresponds to the "first part" described in the claims.

In the installed state, the fourth main pipe portion 74 is located on the outdoor unit 10 side of the fifth main pipe portion 75 in the liquid-side connection circuit RC3a. In the installed state, in the second branch pipe unit 60f, the refrigerant flowing from the outdoor unit 10 to the indoor units 40 flows downward through the fourth main pipe portion 74. That is, the fourth main pipe portion 74 of the second branch pipe unit 60f corresponds to the "vertical main pipe part" described in the claims.

The main pipe 70B' of the second branch pipe unit 60f includes the third main pipe portion 73 (corresponding to the "vertical main pipe part") and the fourth main pipe portion 74 (corresponding to the "vertical main pipe part"). In the installed state, the third main pipe portion 73 and the fourth main pipe portion 74 are located on the outdoor unit 10 side of the fifth main pipe portion 75 (corresponding to the "first part") in the liquid-side connection circuit RC3a. The third main pipe portion 73 and the fourth main pipe portion 74 extend in the y direction. In the installed state, the refrigerant flowing from the outdoor unit 10 to the indoor units 40 flows downward through the third main pipe portion 73 and the fourth main pipe portion 74. In the installed state, the refrigerant flowing from the outdoor unit 10 to the indoor units 40 flows upward through the second extending portions 82a.

Also when the second branch pipe unit 60f is used, the similar effects produced in the case where the second branch pipe unit 60e is used are produced.

(8-7) Variation 7

Figure 18:
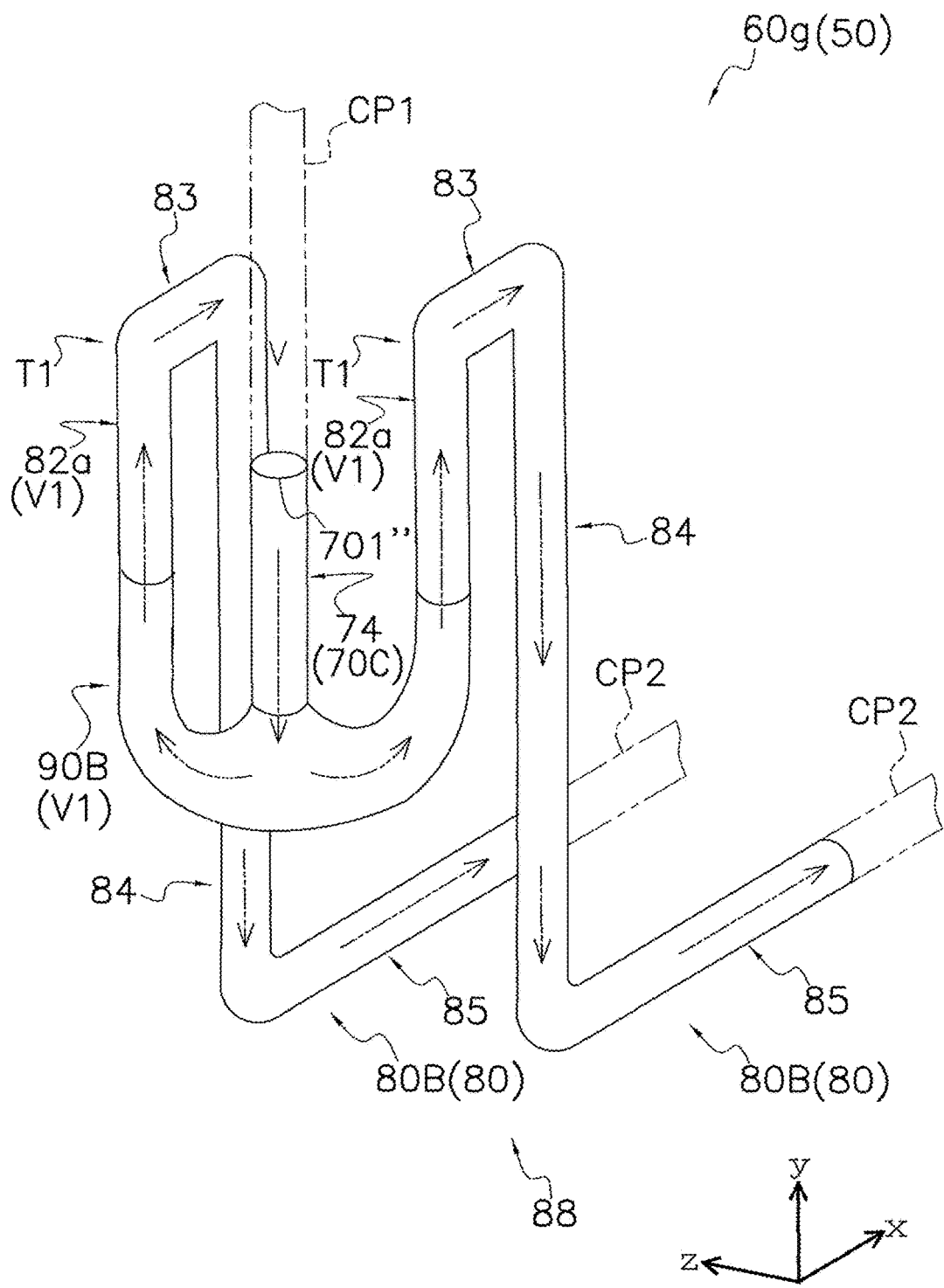
FIG. 18 is a schematic view of a second branch pipe unit according to variation 7.

For example, the second branch pipe unit 60e may have a configuration similar to that of a second branch pipe unit 60g illustrated in FIG. 18. FIG. 18 is a schematic view of the second branch pipe unit 60g. Two-dot chain-line arrows illustrated in FIG. 18 indicate the flowing direction of the refrigerant during the forward cycle operation. Portions of the second branch pipe unit 60g different from those of the second branch pipe unit 60e are described below.

The second branch pipe unit 60g has a main pipe 70C instead of the main pipe 70B. Unlike the main pipe 70B, the third main pipe portion 73 is omitted in the main pipe 70C. In relation to this, the proximal end of the fourth main pipe portion 74 forms the one end 701" of the main pipe 70B and is connected to the outdoor unit-side connection pipe CP1 in the installed state.

In the second branch pipe unit 60g, as is the case with the second branch pipe unit 60e, the rise portions V1 and the trap portions T1 are formed by the branch pipes 80B and the connection pipe portion 90B. Also in the case where the second branch pipe unit 60g is disposed instead of the second branch pipe unit 60, the similar effects to those of the above-described embodiments are produced.

(8-8) Variation 8

According to the present embodiments, the cases where the liquid-side branch portion BL1 as one of the liquid-side branch portions BPa located furthest toward the outdoor unit 10 is formed by the second branch pipe unit 60 are described. However, it is sufficient that the branch portion BP formed by the second branch pipe unit 60 be appropriately selected in view of the necessity for forming the trap portion T1 in accordance with the design specification and the installation environment. For example, any or all of the liquid-side branch portions BL2, BL3, BL4, BL5, and BL6 illustrated in FIG. 2 may be formed by the second branch pipe unit 60.

(8-9) Variation 9

The second extending portion 82 does not necessarily extend at right angles to the extending direction of the first extending portion 81 or the main pipe 70. That is, the inclination angle of the second extending portion 82 relative to the extending direction of the first extending portion 81 or the main pipe 70 may be, for example, smaller than 90 degrees. For example, the second extending portion 82 may extend in the y direction at an inclination angle of 30 to 60 degrees relative to the extending direction of the first extending portion 81 or the main pipe 70.

(8-10) Variation 10

According to the above-described embodiments, the second branch pipe unit 60 is formed by joining to each other the main pipe 70, the connection pipe portion 90, and the branch pipes 80 that are separately formed. However, the second branch pipe unit 60 may be formed by, for example, integrally forming any or all of the main pipe 70, the connection pipe portion 90, and the branch pipes 80. For example, the second branch pipe unit 60 may be formed by bending a single pipe. Alternatively, for example, the second branch pipe unit 60 may be formed by joining a plurality of pipes to each other.

(8-11) Variation 11

Configuration forms of the main pipe 70, the connection pipe portion 90, and the branch pipes 80 included in the second branch pipe unit 60 can be appropriately selected. That is, each of the main pipe 70, the connection pipe portion 90, and the branch pipes 80 may be, for example, formed by bending a single pipe or joining a plurality of pipes to each other.

(8-12) Variation 12

The cases where each of the predetermined liquid-side branch portions BP is entirely formed by the second branch pipe unit 60 are described according to the above-described embodiments. However, the branch portion BP is not necessarily entirely formed by the second branch pipe unit 60. For example, only part of the branch portion BP may be formed by the second branch pipe unit 60. That is, the branch portion BP may be formed by, for example, in addition to the second branch pipe unit 60, another pipe or other pipes (for example, any or all of the outdoor unit-side connection pipe CP1 and the indoor unit-side connection pipe CP2, or another pipe unit).

(8-13) Variation 13

The cases where the second branch pipe unit 60 is assembled in advance and delivered to the work site are described according to the above-described embodiments. However, this is not limiting. For example, the second branch pipe unit 60 may be assembled by joining or cutting portions of the second branch pipe unit 60 at the work site. For example, the second branch pipe unit 60 may be assembled by joining, to the other portions, any/all of the main pipe 70, the connection pipe portion 90, and the branch pipes 80 that are separated from the other portions at the work site. Alternatively, for example, the second branch pipe unit 60 may be assembled by cutting any/all of the main pipe 70, the connection pipe portion 90, and the branch pipes 80 at the work site according to need.

For example, any/all of portions included in the main pipe 70 may be assembled by joining the portion or the portions to the other portion or the other portions included in the main pipe 70 at the work site. Alternatively, for example, any/all of the portions included in the main pipe 70 may be assembled by cutting the portion or the portions at the work site according to need.

For example, any/all of portions included in the connection pipe portion 90 may be assembled by joining the portion or the portions to the other portion or the other portions included in the main pipe 70 at the work site. Alternatively, for example, any/all of the portions included in the connection pipe portion 90 may be assembled by cutting the portion or the portions at the work site according to need.

For example, any/all of portions (for example, 81 to 85) included in each of the branch pipes 80 may be assembled by joining the portion or the portions to the other portion or the other portions included in the main pipe 70 at the work site. Alternatively, for example, any/all of the portions (for example, 81 to 85) included in the branch pipe 80 may be assembled by cutting the portion or the portions at the work site according to need.

(8-14) Variation 14

The cases where the branch pipe 80 is formed by the first extending portion 81, the second extending portion 82, the folded back portion 83, the third extending portion 84, and the fourth extending portion 85 are described according to one or more embodiments. However, the configuration form of the branch pipe 80 is not necessarily limited to this and may be appropriately changed as long as consistency is maintained between the operating effects of the changed form and those of the above-described embodiments. For example, any/all of the first extending portion 81, the folded back portion 83, the third extending portion 84, and the fourth extending portion 85 may be omitted from the branch pipes 80. For example, the branch pipe 80 may additionally have a portion other than the first extending portion 81, the folded back portion 83, the third extending portion 84, and the fourth extending portion 85.

(8-15) Variation 15

The cases where the branch pipe 80 is configured such that the size of the branch pipe 80 is the greater than or equal to two bus and smaller than or equal to six bus are described according to the above-described embodiments. In this regard, the outer diameter and/or the inner diameter of the branch pipe 80 is not necessarily uniform from one end to the other end. The branch pipe 80 may have a portion where, for example, the outer diameter and/or the inner diameter of the branch pipe 80 partially increases or reduces.

(8-16) Variation 16

According to the above-described embodiments, the x direction corresponds to the left-right direction in the installed state and the z direction corresponds to the front-rear direction in the installed state. However, this is not limiting. For example, the x direction may correspond to the front-rear direction in the installed state and the z direction may correspond to the left-right direction in the installed state.

(8-17) Variation 17

The installation form of the second branch pipe unit 60 illustrated in FIG. 7 is only an example. For example, the installation form of the second branch pipe unit 60 may be appropriately changed in accordance with the design specification and the installation environment and may be reversed in the front-rear direction, left-right direction, and/or the up-down direction according to need.

(8-18) Variation 18

According to the above-described embodiments, the branch pipe group 88 of the second branch pipe unit 60 has two branch pipes 80 (80a, 80b). However, the branch pipe group 88 may have, for example, three or more branch pipes 80. In this case, for example, the rise portion V1 (upward extending portion) may be appropriately formed in the predetermined branch pipe 80 or the predetermined branch pipes 80 in accordance with the design specification and the installation environment.

(8-19) Variation 19

The configuration form of the refrigerant circuit RC according to the above-described embodiments is not limited to the form illustrated in FIG. 1 and can be appropriately changed in accordance with the design specification and the installation environment.

For example, the first outdoor control valve 16 is not necessarily provided and may be appropriately omitted. In this case, the function of the first outdoor control valve 16 may be performed by, for example, the second outdoor control valve 17 during the reverse cycle operation.

For example, the second outdoor control valve 17 is not necessarily disposed in the outdoor unit 10 and may be disposed outside the outdoor unit 10 (for example, in the liquid-side connection piping La).

For example, the indoor expansion valve 41 is not necessarily disposed in the indoor units 40 and may be disposed outside the indoor units 40 (for example, in the liquid-side connection piping La).

For example, the super cooler 15 or the third outdoor control valve 18 is not necessarily provided and may be appropriately omitted. In contrast, for example, a device that is not illustrated in FIG. 1 may be newly added.

For example, a refrigerant channel switching unit may be disposed between the outdoor unit 10 and each of the indoor units 40 in the refrigerant circuit RC. The refrigerant channel switching unit switches the flow of the refrigerant flowing into the indoor unit 40 so as to allow each of indoor units 40 to independently perform the forward cycle operation or the reverse cycle operation.

(8-20) Variation 20

In the air conditioning system 100 according to the above-described embodiments, the plurality of (four or more) indoor units 40 are connected in series or parallel with each other with respect to a single outdoor unit 10 through the connection piping (Ga, La). In this regard, the numbers and the connection form of outdoor units 10 and/or indoor units 40 can be appropriately changed in accordance with the installation environment and the design specification. For example, a plurality of outdoor units 10 may be disposed in series or parallel with each other.

(8-21) Variation 21

According to the above-described embodiments, R32 is used as the refrigerant circulating through the refrigerant circuit RC. However, the refrigerant used for the refrigerant circuit RC is not limited and may alternatively be another refrigerant. For example, an HFC based refrigerant such as R407C or R410A may be used for the refrigerant circuit RC.

(8-22) Variation 22

The thought relating to the present invention is applied to the air conditioning system 100 according to the above-described embodiments. However, this is not limiting. The thought relating to the present invention can also be applied to other refrigeration apparatuses having a refrigerant circuit (for example, a water heater, a heat pump chiller, and so forth).

(8-23) Variation 23

The second branch pipe unit 60 is applied to the air conditioning system 100 that performs gas-liquid two-phase transport during the forward cycle operation according to the above-described embodiments. However, application of the second branch pipe unit 60 to an air conditioning system that performs liquid transport is not necessarily precluded.

(9)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The present invention can be employed for a pipe unit or an air conditioning system.

REFERENCE SIGNS LIST

10: outdoor unit
40: indoor unit
40a, 40b: indoor unit
40c, 40d: indoor unit
50: branch pipe unit
51: first branch pipe unit
60, 60a to 60g: second branch pipe unit (pipe unit)
70, 70A, 70B, 70B', 70C: main pipe
71: first main pipe portion (first part)
72: second main pipe portion (vertical main pipe part)
73: third main pipe portion (vertical main pipe part, horizontal main pipe part)
74: fourth main pipe portion (vertical main pipe part)
75: fifth main pipe portion (first part)
80, 80A, 80B: branch pipe
80a, 80a': first branch pipe
80b, 80b': second branch pipe
81, 81': first extending portion (fifth part)
82, 82', 82a: second extending portion (second part, outdoor unit-side vertical branch pipe part)
83, 83': folded back portion (folded back part)
84, 84': third extending portion (third part, indoor unit-side vertical branch pipe part)
85, 85': fourth extending portion (fourth part, horizontal branch pipe part)
88: branch pipe group
90, 90A, 90B: connection pipe portion (connecting pipe)
91: connection pipe extending portion
95: heat insulating material
100: air conditioning system
701, 701', 701": one end of main pipe
702, 702', 702": another end of main pipe
801: one end of branch pipe
802: another end of branch pipe
901: first connection portion
902: second connection portion
902': end portion of connection pipe portion (end portion of connecting pipe)
B1: building
BP: branch portion
BPa, BL1 to BL6: liquid-side branch portion
BPb: gas-side branch portion
C1: bottom surface of a space above a ceiling
C2: top surface of a space above a ceiling
CP1: outdoor unit-side connection pipe
CP2: indoor unit-side connection pipe
G: gas trap
Ga: gas-side connection piping
G1 to G5: first gas-side connection pipe to fifth gas-side connection pipe
La: liquid-side connection piping (connection pipe)
L1 to L5: first liquid-side connection pipe to fifth liquid-side connection pipe
P1 to P14: first pipe to fourteenth pipe
RC: refrigerant circuit
RC1: outdoor-side circuit
RC2: indoor-side circuit
RC3: connection circuit
RC3a: liquid-side connection circuit (liquid-side refrigerant channel)
RC3b: gas-side connection circuit
SP, SP1, SP2: target space
SPa: space above a ceiling
T1: trap portion
V1: rise portion

PATENT LITERATURE

[PTL 1] International Publication No. 2015/029160

The invention claimed is:

1. A pipe unit that allows a refrigerant to divide or merge, the pipe unit comprising:
branch pipes;
a main pipe that communicates with each of the branch pipes and allows the refrigerant to flow to or from each of the branch pipes; and
a connection pipe portion that connects the main pipe and each of the branch pipes, wherein
the pipe unit is connected to a connection pipe,
the pipe unit and the connection pipe together form a liquid-side refrigerant channel between an outdoor unit and indoor units,
the main pipe is disposed, in an installed state, on an outdoor unit side of the branch pipes,
the main pipe comprises a vertical main pipe part that extends in a vertical direction in the installed state,
at least one of the branch pipes comprises:
an outdoor unit-side vertical branch pipe part that extends in the vertical direction in the installed state;
an indoor unit-side vertical branch pipe part that is disposed, in the installed state, on an indoor unit side of the outdoor unit-side vertical branch pipe part in the liquid-side refrigerant channel, and extends in the vertical direction in the installed state; and
a folded back part that is disposed, in the installed state, between the outdoor unit-side vertical branch pipe part and the indoor unit-side vertical branch pipe part in the liquid-side refrigerant channel, and connects the outdoor unit-side vertical branch pipe part to the indoor unit-side vertical branch pipe part, the main pipe and the connection pipe portion are disposed such that the refrigerant flowing from the outdoor unit to the indoor units through the liquid-side refrigerant channel flows into the connection pipe portion in a gas-liquid two-phase state.

2. The pipe unit according to claim 1, wherein the at least one of the branch pipes further comprises a horizontal branch pipe part disposed, in the installed state, on the indoor unit side of the indoor unit-side vertical branch pipe part in the liquid-side refrigerant channel, and the horizontal branch pipe part extends in a horizontal direction, in the installed state.

3. The pipe unit according to claim 1, wherein a size of the branch pipes is greater than or equal to two bus and smaller than or equal to six bus.

4. An air conditioning system comprising the pipe unit according to claim 1, and further comprising:

the outdoor unit;

the indoor units; and the connection pipe.

5. The pipe unit according to claim 1, wherein the main pipe further comprises a horizontal main pipe part, wherein the horizontal main pipe part extends in a horizontal direction, in the installed state, and the horizontal main pipe part is disposed on the outdoor unit side of the vertical main pipe part, in the installed state.

6. The pipe unit according to claim 5, wherein the horizontal main pipe part and the vertical main pipe part are disposed such that the refrigerant flowing from the outdoor unit to the indoor units, through the liquid-side refrigerant channel, flows downward in the-vertical main pipe part, in the installed state.

* * * * *